United States Patent
Otomo et al.

(10) Patent No.: US 10,088,824 B2
(45) Date of Patent: Oct. 2, 2018

(54) TOOLPATH EVALUATION METHOD, TOOLPATH GENERATION METHOD, AND TOOLPATH GENERATION DEVICE

(71) Applicant: MAKINO MILLING MACHINE CO., LTD., Tokyo (JP)

(72) Inventors: Yuji Otomo, Tokyo (JP); Yuki Tanigawa, Tokyo (JP); Soichiro Asami, Tokyo (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 231 days.

(21) Appl. No.: 15/021,619

(22) PCT Filed: Sep. 13, 2013

(86) PCT No.: PCT/JP2013/074909
§ 371 (c)(1),
(2) Date: Mar. 11, 2016

(87) PCT Pub. No.: WO2015/037143
PCT Pub. Date: Mar. 19, 2015

(65) Prior Publication Data
US 2016/0224006 A1    Aug. 4, 2016

(51) Int. Cl.
*G05B 19/27* (2006.01)
*G05B 19/18* (2006.01)
(Continued)

(52) U.S. Cl.
CPC ............. *G05B 19/27* (2013.01); *G05B 19/18* (2013.01); *G05B 19/4093* (2013.01);
(Continued)

(58) Field of Classification Search
CPC .... G05B 19/18; G05B 19/4093; G05B 19/27; G05B 2219/39573; G05B 19/4097; G05B 2219/35313; G05B 2219/45145
(Continued)

(56) References Cited

U.S. PATENT DOCUMENTS 5,884,682 A * 3/1999 Kennedy ................. B27B 1/007
144/242.1
6,311,098 B1 * 10/2001 Higasayama ...... G05B 19/4099
700/159

(Continued)

FOREIGN PATENT DOCUMENTS

JP    8-229770    9/1996
JP    9-155690    6/1997
(Continued)

OTHER PUBLICATIONS

D. Prat,et al. (Sep. 2, 2011). "Analyse des configurations d'usinage en 5 axes à la fraise hémisphérique," 20ème Congrès Français de Mécanique, Retrieved from URL:http://documents.irevues.inist.fr/bitstream/handle/2042/46140/cfm2011_910.pdf?sequence=1 [retrieved on Mar. 27, 2017]; 6 pages.

(Continued)

*Primary Examiner* — Chun Cao
(74) *Attorney, Agent, or Firm* — Morrison & Foerster LLP

(57) ABSTRACT

A method for evaluating a toolpath traveled by a rotating tool when the rotating tool machines a workpiece while moving relative to the workpiece, including: a calculation step for, based on a predetermined target toolpath and the shape of the workpiece before the workpiece is machined by moving the rotating tool along the target toolpath, calculating the dimensions of a contact area of the bottom surface portion of the rotating tool where the bottom portion is predicted to be in contact with the workpiece when the (Continued)

workpiece is actually machined by moving the rotating tool along the target toolpath, said bottom surface portion intersecting the rotational axis line of the tool; and a determination step for determining that the target toolpath is inappropriate if the dimensions of the contact area exceed predetermined threshold values when the rotating tool is positioned at any location along the target toolpath.

12 Claims, 19 Drawing Sheets

(51) Int. Cl.
 *G05B 19/4093* (2006.01)
 *G05B 19/4097* (2006.01)
(52) U.S. Cl.
 CPC .............. *G05B 19/4097* (2013.01); *G05B 2219/35313* (2013.01); *G05B 2219/39573* (2013.01); *G05B 2219/45145* (2013.01)
(58) Field of Classification Search
 USPC .......................................................... 700/186
 See application file for complete search history.

(56) References Cited

U.S. PATENT DOCUMENTS

| | | | | |
|---|---|---|---|---|
| 2006/0291969 | A1* | 12/2006 | Koch | .................. G05B 19/182 409/132 |
| 2009/0132080 | A1* | 5/2009 | Glasser | ................. B23Q 15/22 700/105 |
| 2015/0028007 | A1* | 1/2015 | Pluss | ....................... B24B 53/00 219/121.69 |

FOREIGN PATENT DOCUMENTS

| | | |
|---|---|---|
| JP | 11-202916 | 7/1999 |
| JP | 2003-256010 | 9/2003 |
| JP | 2007-61935 | 3/2007 |
| JP | 2007-257182 | 10/2007 |
| JP | 2011-183528 | 9/2011 |

OTHER PUBLICATIONS

Search Opinion dated Apr. 6, 2017, directed to EP Application No. 13 893 433.6; 5 pages.
International Search Report dated Oct. 22, 2013, directed to International Application No. PCT/JP2013/074909, 2 pages.

* cited by examiner

☒ : PART IN CONTACT WITH WORKPIECE

☒ : CONTACT ARER AT

☒ : ROUND ARER AR

US 10,088,824 B2

TOOLPATH EVALUATION METHOD, TOOLPATH GENERATION METHOD, AND TOOLPATH GENERATION DEVICE

CROSS REFERENCE TO RELATED APPLICATIONS

This application is a U.S. National Phase patent application of International Patent Application No. PCT/JP2013/074909, filed Sep. 13, 2013, which is hereby incorporated by reference in the present disclosure in its entirety.

FIELD OF THE INVENTION

The present invention relates to a toolpath evaluation method, a toolpath generation method, and a toolpath generation device.

BACKGROUND OF THE INVENTION

In recent years, machining using an end mill or other milling tool has been made highly automated by numerical control, computer control, and other techniques. Such an automated machine tool is operated in accordance with a processing program in which path information of the tool, processing conditions of the workpiece, etc. are coded. Further, due to shape data of workpieces prepared by a CAD (Computer Aided Design) system, CAM (Computer Aided Manufacturing) systems which enable a processing program to be automatically prepared have been spreading. A CAM system receives as input not only shape data of a workpiece which is output from the CAD system, but also various types of information relating to the tools, workpieces, etc. so as to automatically generate a processing program including the toolpath.

Japanese Unexamined Patent Publication No. 2007-257182A discloses a method of calculation for calculating an amount of interference of a milling tool penetrating inside a workpiece in virtual profile machining using a computer.

CITATIONS LIST

Patent Literature

PLT 1. Japanese Unexamined Patent Publication No. 2007-257182A

SUMMARY OF THE INVENTION

A toolpath included in a processing program generated by a CAM system is for example a toolpath following along an outer shape of a target shape of a workpiece and is not a path considering a load which is applied to a tool during processing of the workpiece. In this regard, if an excessive load is applied to the tool during processing of the workpiece, the tool is liable to break, the tool is liable to bend causing the processing precision to fall, or an excessive load is liable to be applied to a spindle of a machine tool. For this reason, in the past, the method of finding the amount of contact of a tool and workpiece to predict the load and generate a toolpath has been invented. This is also disclosed in PLT 1.

The side surface of a cylindrical part of a rotary tool is fast in circumferential speed of the cutting edges, so processing is possible even if the amount of contact is great. As opposed to this, the bottom surface of a rotary tool has a point at the center part where the circumferential speed of the cutting edge becomes zero. Sometimes processing is not possible even with the same amount of contact. Further, at the bottom surface of the rotary tool, problems easily arise such as the circumferential speed of the cutting edges becoming slower even outside of the center part and the tool breaking even with a small amount of contact. If predicting the load by the amount of contact of the tool and workpiece in this way, it is not possible to suitably evaluate the load.

The toolpath evaluation method of the present invention is a toolpath evaluation method evaluating a toolpath when a rotary tool moves relative to a workpiece while processing the workpiece. The toolpath evaluation method includes a calculation step of using a predetermined target toolpath and a shape of the workpiece before processing by the target toolpath as a basis to calculate a size of a contact area predicted to actually be in contact with the workpiece during processing by the target toolpath at a bottom surface portion of the rotary tool intersecting a rotational axis of the tool and a judging step of judging that the target toolpath is unsuitable when the size of the contact area exceeds a predetermined threshold value.

In the above invention, in the calculation step, the size of the contact area may be found as a ratio of an area of the contact area to an area of the bottom surface portion.

In the above invention, in the calculation step, the bottom surface portion of the rotary tool may be converted to a round area on a virtual plane perpendicularly intersecting the rotational axis of the tool and the size of the contact area at the round area may be calculated.

The toolpath evaluation method of the present invention is a toolpath evaluation method evaluating a toolpath when a rotary tool moves relative to a workpiece while processing the workpiece. The toolpath evaluation method includes a step of using a predetermined target toolpath and a shape of the workpiece before processing by the target toolpath as a basis to find a contact area predicted to actually be in contact with the workpiece during processing by a target toolpath at a bottom surface portion of the rotary tool intersecting the rotational axis of the tool and a step of judging that the target toolpath is unsuitable when at least part of the contact area overlaps a predetermined center area at the bottom surface portion.

The toolpath generation method of the present invention is a toolpath generation method generating a toolpath when a rotary tool moves relative to a workpiece while processing the workpiece. The toolpath generation method includes a calculation step of using a predetermined target toolpath and a shape of the workpiece before processing by the target toolpath as a basis to calculate a size of a contact area predicted to actually be in contact with the workpiece during processing by the target toolpath at a bottom surface portion of the rotary tool intersecting the rotational axis of the tool and a moved path generating step of generating a moved toolpath obtained by moving the target toolpath when the size of the contact area exceeds a predetermined threshold value until the size of the contact area becomes a threshold value or less.

In the above invention, the toolpath generation method may further include an auxiliary path generation step of generating an auxiliary toolpath for processing a still uncut part remaining at the processed workpiece resulting from the moved toolpath.

In the above invention, the moved toolpath is preferably a toolpath obtained by moving the target toolpath along the rotational axis of the tool in a direction away from the workpiece.

In the above invention, the auxiliary path generation step may include an additional calculation step of using the target toolpath and a shape of the processed workpiece resulting from the moved toolpath as a basis to calculate a size of a contact area and an additional moved path generating step of generating a moved toolpath obtained by moving the target toolpath when the size of the contact area calculated by the additional calculation step exceeds a threshold value until the size of the contact area calculated by the additional calculation step becomes a threshold value or less. The auxiliary path generation step may repeat the additional calculation step and additional moved path generating step until the size of the contact area calculated by the additional calculation step becomes the threshold value or less.

The toolpath generation method of the present invention is a toolpath generation method evaluating a toolpath when a rotary tool moves relative to a workpiece while processing the workpiece. The toolpath generation method includes a step of using a predetermined target toolpath and a shape of the workpiece before processing by the target toolpath as a basis to find a contact area predicted to actually be in contact with a workpiece during processing by the target toolpath at a bottom surface portion of the rotary tool intersecting a rotational axis of the tool and a step of generating a moved toolpath obtained by moving the target toolpath when at least part of the contact area overlaps a predetermined center area at the bottom surface portion until the contact area as a whole separates from the center area.

The toolpath generation device of the present invention is a toolpath generation device generating a toolpath when a rotary tool moves relative to a workpiece while processing the workpiece. The toolpath generation device comprises a calculating unit using a predetermined target toolpath and a shape of the workpiece before processing by the target toolpath as a basis to calculate a size of a contact area predicted to actually be in contact with the workpiece during processing by the target toolpath at a bottom surface portion of the rotary tool intersecting the rotational axis of the tool, a moved path generating unit generating a moved toolpath obtained by moving the target toolpath when the size of the contact area exceeds a predetermined threshold value until the size of the contact area becomes the threshold value or less, and an auxiliary path generating unit generating an auxiliary toolpath for processing a still uncut part remaining at a processed workpiece resulting from the moved toolpath.

In the above invention, the calculating unit may find the size of the contact area as a ratio of an area of the contact area to the area of the bottom surface portion.

In the above invention, the calculating unit may convert the bottom surface portion of the rotary tool to a round area on a virtual plane perpendicularly intersecting the rotational axis of the tool and calculate the size of the contact area at the round area.

In the above invention, the moved toolpath is preferably a toolpath obtained by moving the target toolpath along the rotational axis of the tool in a direction away from the workpiece.

The toolpath generation device of the present invention is a toolpath generation device generating a toolpath when a rotary tool moves relative to a workpiece while processing the workpiece. The toolpath generation device comprises a contact area calculating unit using a predetermined target toolpath and a shape of the workpiece before processing by the target toolpath as basis to find a contact area predicted to actually be in contact with the workpiece during processing by the target toolpath at a bottom surface portion of the rotary tool intersecting the rotational axis of the tool, a moved path generating unit generating a moved toolpath obtained by moving the target toolpath when at least part of the contact area overlaps a predetermined center area at the bottom surface portion until the contact area as a whole separates from the center area, and an auxiliary path generating unit generating an auxiliary toolpath for processing a still uncut part remaining at a processed workpiece resulting from the moved toolpath.

According to the present invention, it is possible to suitably evaluate whether an excessive load would be applied to a tool during processing of a workpiece by a machine tool taking into consideration whether the bottom surface of the tool has a contact area. Due to this, it is possible to generate a toolpath for avoiding application of excessive load.

DETAILED DESCRIPTION OF THE INVENTION

Referring to FIG. 1 to FIG. 16, the toolpath evaluation method, toolpath generation method, toolpath generation device, and the numerical control device of a machine tool of a first embodiment of the present invention will be explained. The "toolpath" in the present invention means a relative path of a rotary tool to a workpiece when processing the workpiece.

Figure 1:
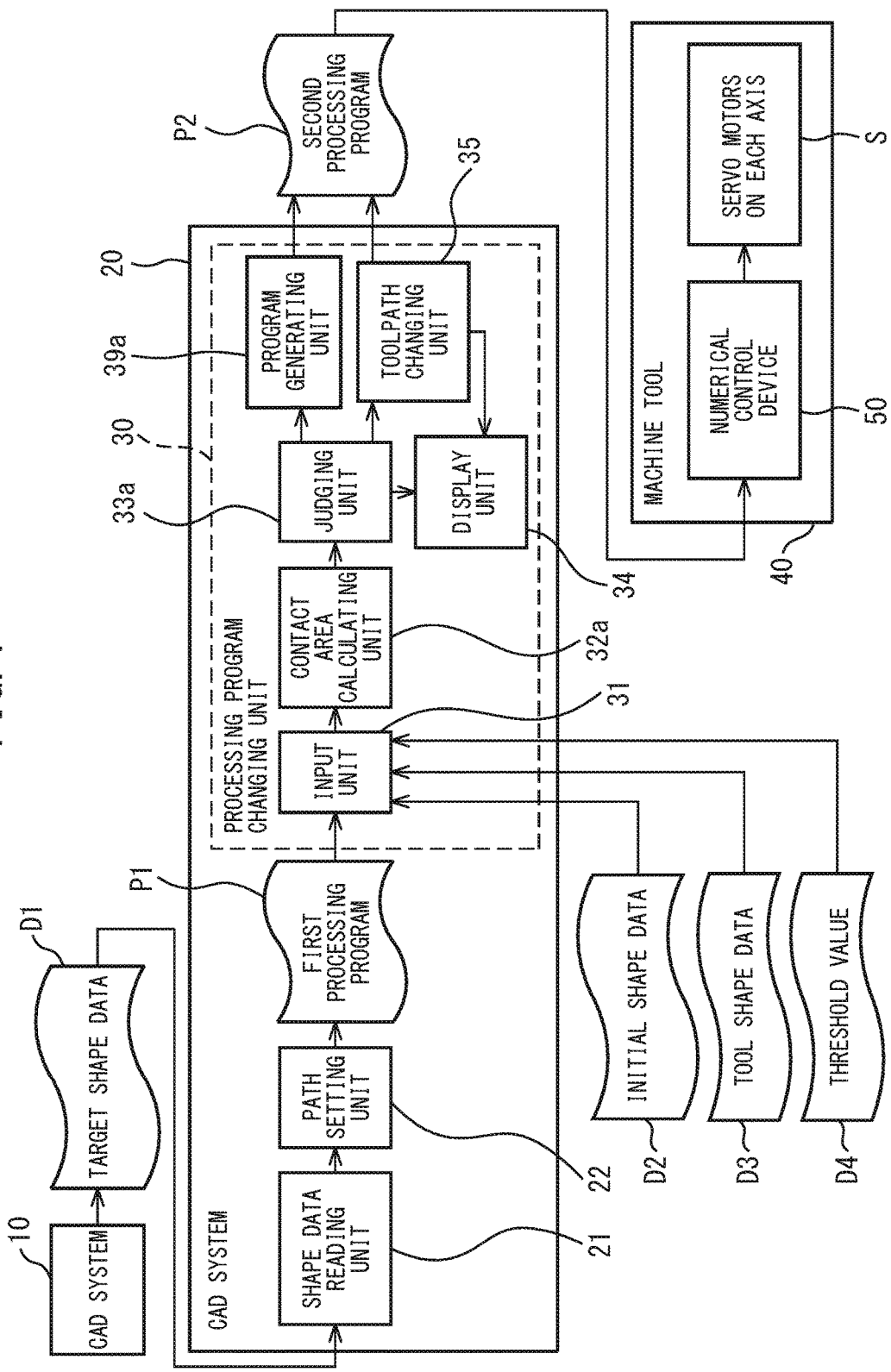
FIG. 1 is a block diagram of a CAM system and machine tool in a first embodiment.

FIG. 1 is a block diagram of a processing system in the present embodiment. The processing system of the present embodiment is provided with a CAD system 10, a CAM system 20, and a machine tool 40. The CAD system 10 generates target shape data D1 of the workpiece in accordance with user operation. The target shape data D1 generated by the CAD system 10 is input to the CAM system 20.

The CAM system 20 outputs a second processing program P2 for processing the workpiece to a target shape. The CAM system 20 is provided with a shape data reading unit 21 and a path setting unit 22. The shape data reading unit 21 reads target shape data D1 generated by the CAD system 10. The path setting unit 22 uses the target shape data D1 etc. as the basis to generate a toolpath. Further, the path setting unit 22 generates a processing program in which the toolpath is set. In the present embodiment, the initial toolpath generated by the path setting unit 22 is called the "target toolpath R1". Further, the processing program generated by the path setting unit 22 is called the "first processing program P1".

The CAM system 20 is provided with a processing program changing unit 30. The processing program changing unit 30 changes the target toolpath R1 to generate a changed toolpath R2. Further, the processing program changing unit 30 generates the second processing program P2 at which the changed toolpath is set. The CAM system 20 functions as the toolpath generation device of the present invention.

The second processing program P2 generated by the CAM system 20 is sent to the machine tool 40. The machine tool 40 is provided with a numerical control device 50 and servo motors S on each axis. The numerical control device 50 reads and interprets the second processing program P2 and performs interpolation processing. The numerical control device 50 uses the second processing program P2 as the basis to send operating commands to the servo motors S on each axis. Further, by servo motors S on each axis driving it in accordance with the operating instructions, the rotary tool moves relative to the workpiece.

Figure 2:
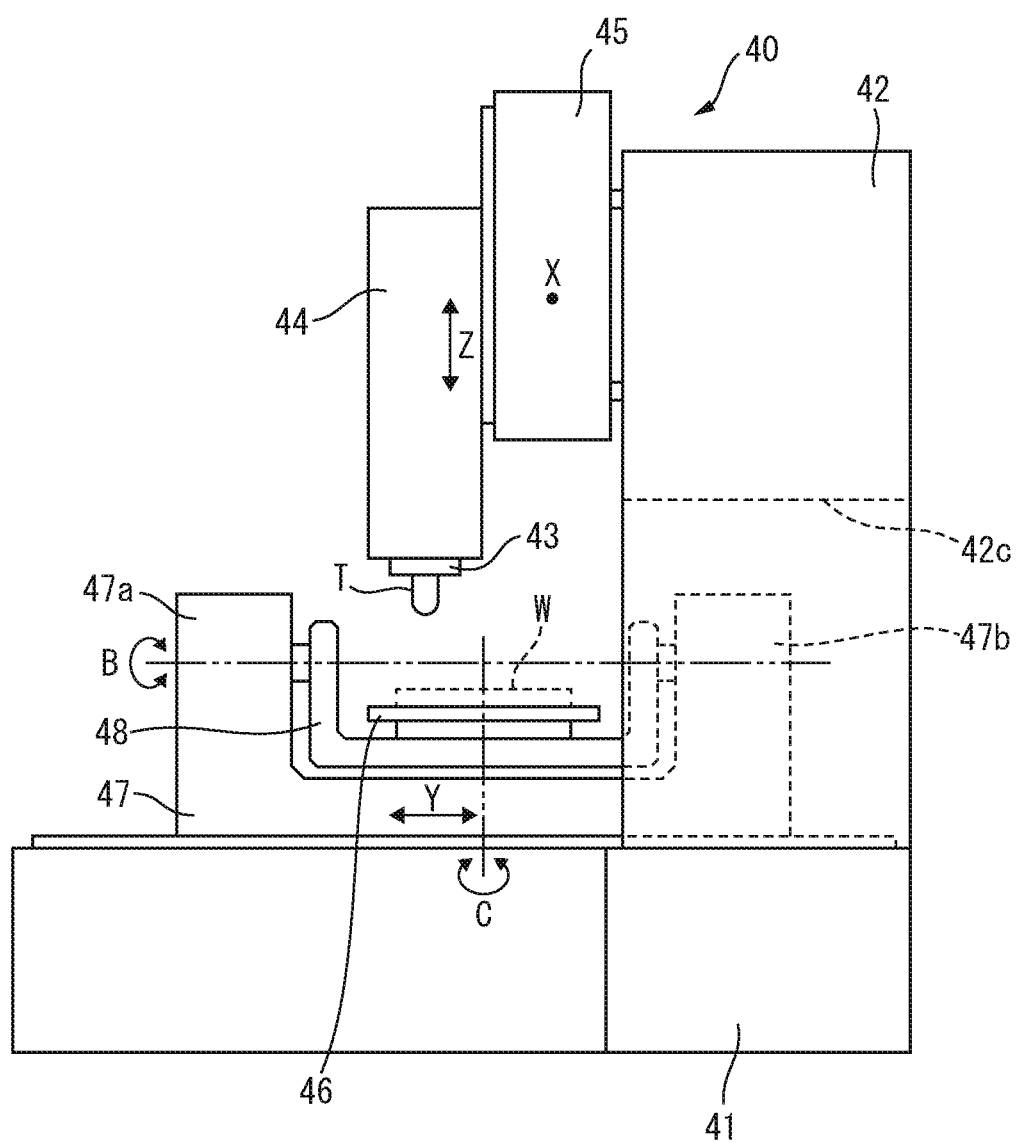
FIG. 2 is a schematic side view of the machine tool in the first embodiment.

FIG. 2 shows a schematic side view of a machine tool 40 in the present embodiment. The machine tool 40 is a table turning type machine tool which makes the workpiece W turn along with a rotary table 46. The machine tool 40 is set with a perpendicularly intersecting X-axis, Y-axis, and Z-axis. The Z-axis is a linear feed axis along which a spindle 43 moves toward the workpiece W. The Y-axis is a linear feed axis along which the carriage 47 moves. A linear feed axis vertical to the Z-axis and Y-axis is set for the X-axis. Further, the machine tool 40 has a B-axis as a rotational axis about an axis extending parallel to the Y-axis. Furthermore, it has a C-axis as a rotational axis about an axis extending in parallel to the Z-axis.

The machine tool 40 is provided with a base constituted by a bed 41 and with a column 42 which is provided standing on the top surface of the bed 41. The machine tool 40 is provided with a spindle head 44 supporting the spindle 43 to be able to rotate and a saddle 45 supporting the spindle head 44 at the front of the column 42. The spindle head 44 supports the spindle 43 facing downward so that the front end of the spindle 43 faces the rotary table 46. At the tip of the spindle 43, a rotary tool T is attached.

The machine tool 40 is provided with a rotary table 46 on which a workpiece W is arranged and a U-shaped swinging support member 48 supporting the rotary table 46. The machine tool 40 is provided with a U-shaped carriage 47 supporting the swinging support member 48. The carriage 47 supports the swinging support member 48 at a pair of support columns 47a, 47b separated from each other in the Y-axial direction. The swinging support member 48 is supported by the carriage 47 at the end parts of the two sides in the Y-axial direction. The swinging support member 48 is supported to be able to swing in the B-axial direction.

The machine tool 40 is provided with a movement system making the rotary tool move relative to the workpiece based on the respective movement axes. The movement system includes servo motors S on each axis driving motion along the respective movement axes. The movement system makes the saddle 45 move with respect to the column 42 in the X-axial direction. The movement system makes the carriage 47 move with respect to the bed 41 in the Y-axial direction. The column 42 is formed with a hollow part 42c so that the carriage 47 can partially enter it. Further, the movement system makes the spindle head 44 move with respect to the saddle 45 in the Z-axial direction. The movement system includes a rotary table 46. The rotary table 46 rotates with respect to the swinging support member 48 in the C-axial direction. Furthermore, the movement system makes the swinging support member 48 rotate with respect to the carriage 47 in the B-axial direction. In this way, the machine tool 40 has three perpendicular linear drive axes and two rotational axes. The machine tool 40 of the present embodiment is a five-axis control type machine tool.

Figure 3:
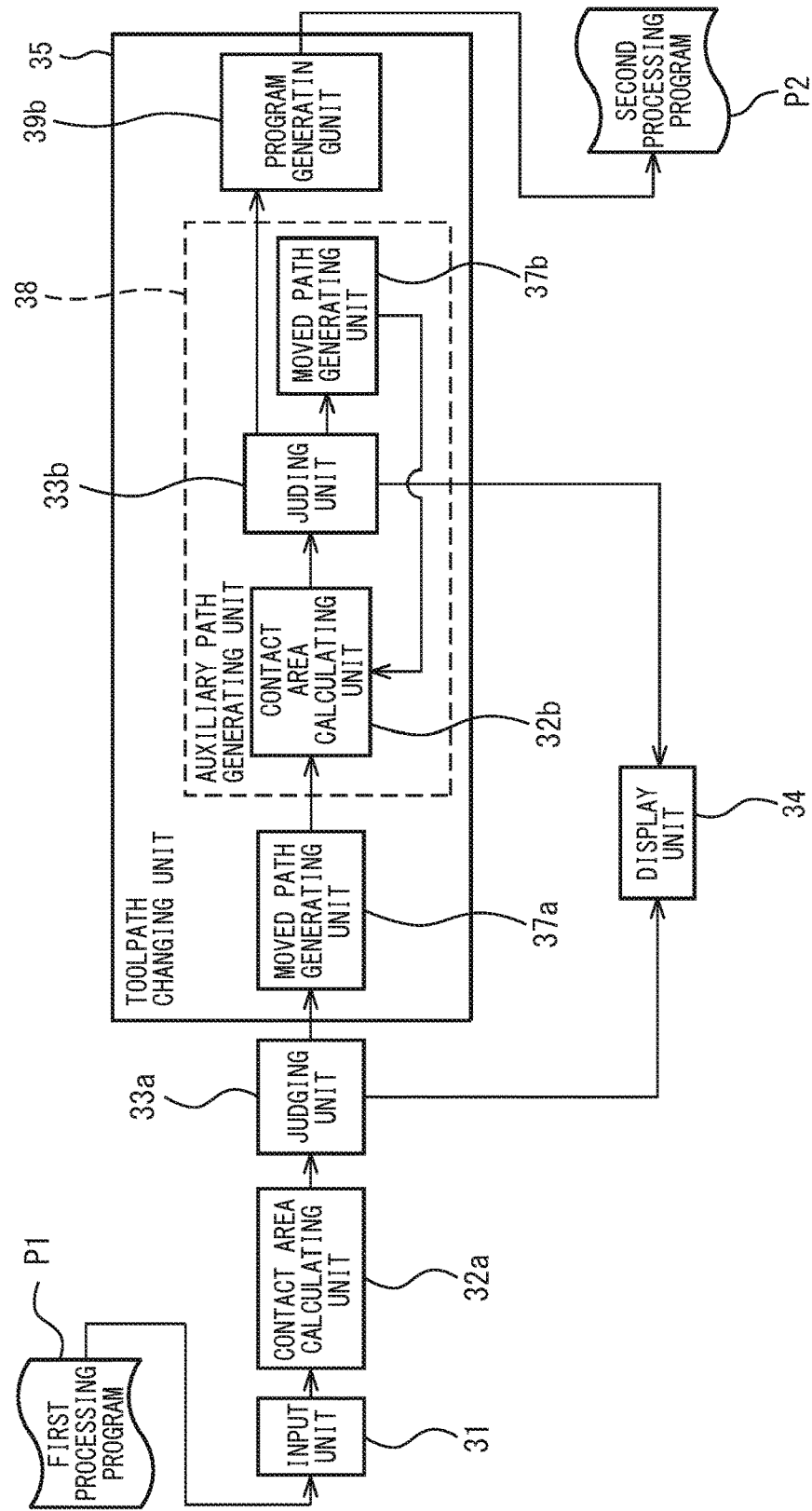
FIG. 3 is a block diagram of a toolpath changing unit in the first embodiment.

In the present embodiment, such a five-axis control type machine tool 40 is used to process the workpiece. FIG. 3 is a block diagram of a toolpath changing unit 34 in the processing program changing unit 30 of the CAM system 20. Referring to FIG. 1 and FIG. 3, the processing program changing unit 30 of the CAM system 20 will be explained in detail. The processing program changing unit 30 includes an input unit 31, contact area calculating unit 32a, judging unit 33a, display unit 34, toolpath changing unit 35, and program generating unit 39a. The input unit 31 receives as input a first processing program P1, initial shape data D2 of the workpiece W, tool shape data D3, and a threshold value D4. The first processing program P1 includes a predetermined target toolpath R1. The target toolpath R1 is, for example, a toolpath following along the target shape of the workpiece. The initial shape data D2 is, for example, the toolpath of the material before processing the workpiece W. The tool shape data D3 is data such as the type or dimensions etc. of the tool. The tool shape data D3 includes the shape or dimensions etc. of the bottom surface portion of the rotary tool. The threshold value D4 is a judgment value for judging the size of the load applied to the bottom surface portion of the rotary tool while processing the workpiece W. The "load" in the present embodiment means the load which acts from the workpiece W to the rotary tool T when the workpiece W and the rotary tool T touch each other.

Figure 4:
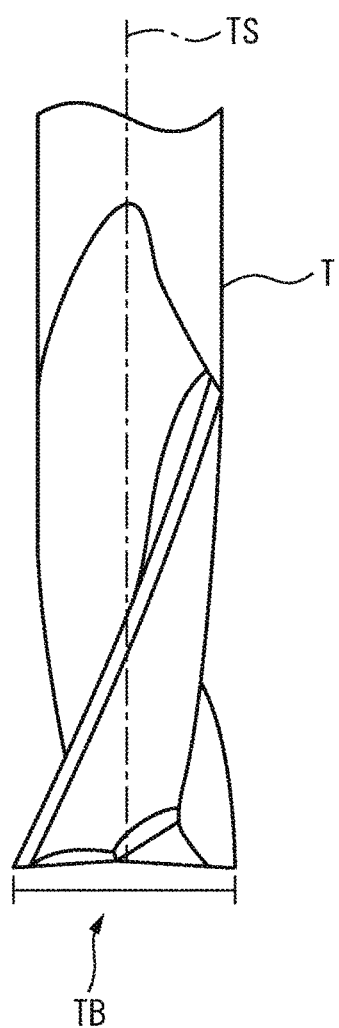
FIG. 4 is a schematic view of a first tool in the first embodiment.
Figure 5:
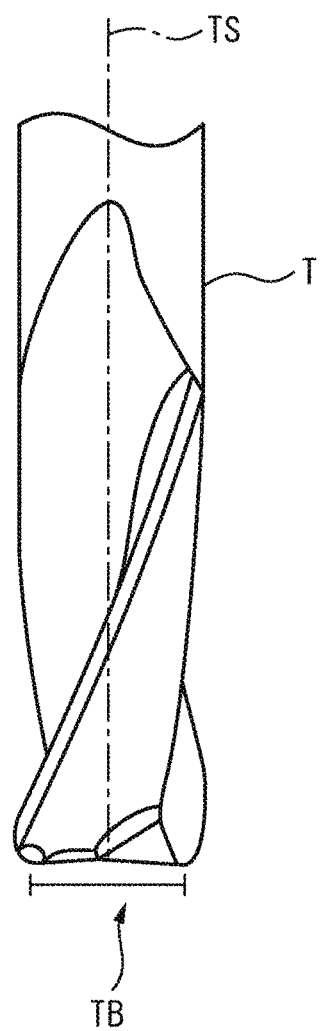
FIG. 5 is a schematic view of a second tool in the first embodiment.
Figure 6:
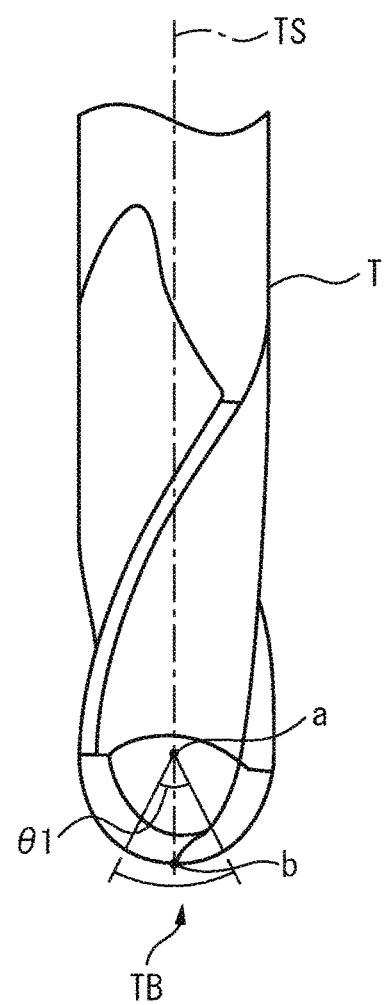
FIG. 6 is a schematic view of a third tool in the first embodiment.

FIG. 4 is a side view showing one rotary tool in which a flat end mill is shown. FIG. 5 is a side view of another rotary tool in which a radius end mill is shown. FIG. 6 is a side view of still another rotary tool in which a ball end mill is shown. As shown from FIG. 4 to FIG. 6, in the present embodiment, all or part of the end face of the tool intersecting a rotational axis TS of the rotary tool T is defined as a bottom surface portion TB of the rotary tool T. For example, for a flat end mill and radius end mill, the flat shaped end face of the tool perpendicularly intersecting the rotational axis TS can be defined as the bottom surface portion TB. Further, for a ball end mill, part of the curved end face of the tool intersecting the rotational axis TS can be defined as the bottom surface portion TB. More specifically, it is possible to designate an angle θ1 of a vertex of a virtual cone having a tool center point "a" of the ball end mill as the vertex. Further, it is possible to define the part of the curved end face of the tool of the ball end mill included in the virtual cone as the bottom surface portion TB.

Figure 7:
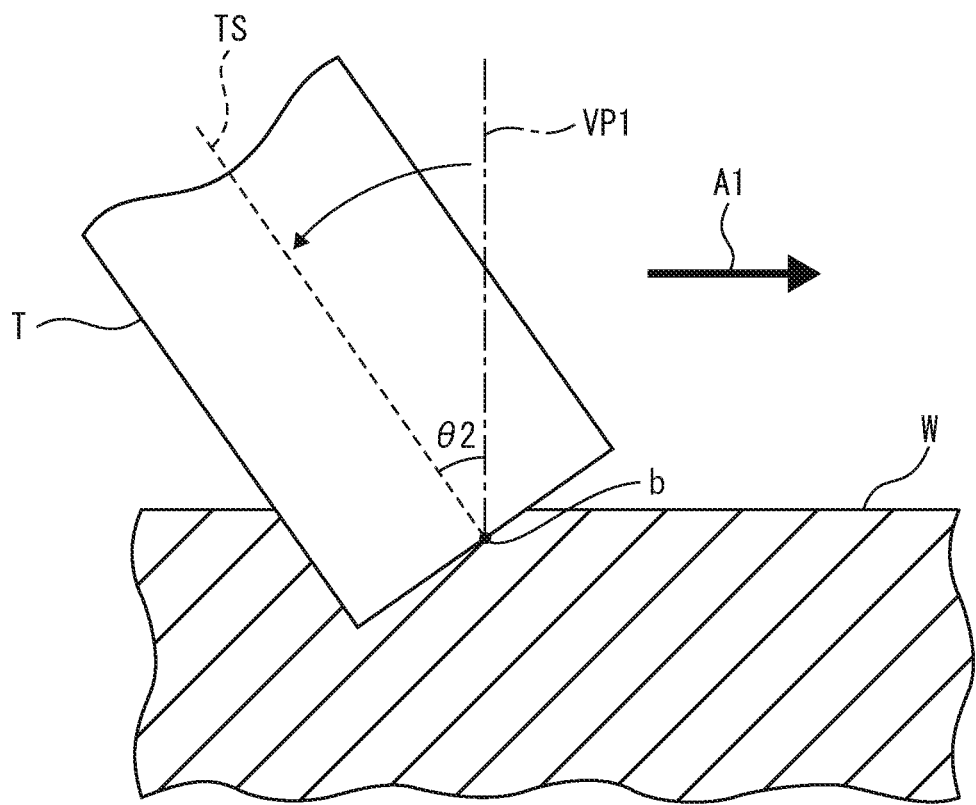
FIG. 7 is a schematic cross-sectional view showing a tool moving along one toolpath in the first embodiment.
Figure 8:
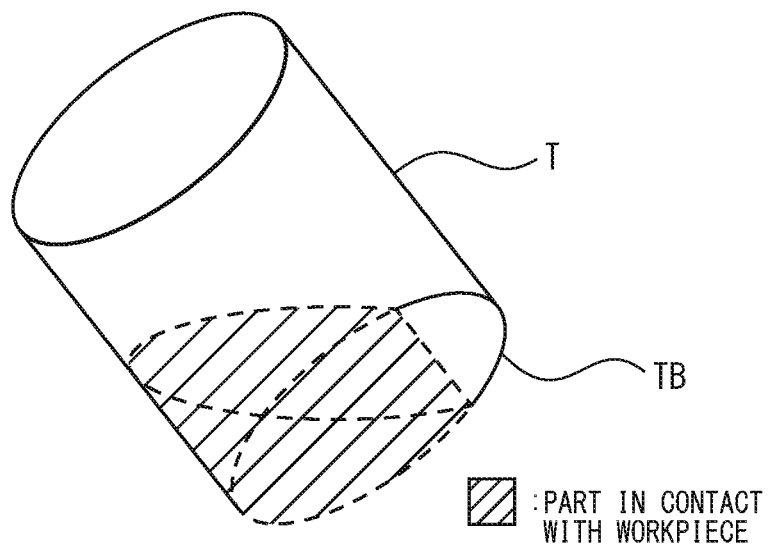
FIG. 8 is a schematic perspective view showing part of a tool in FIG. 7.
Figure 9:
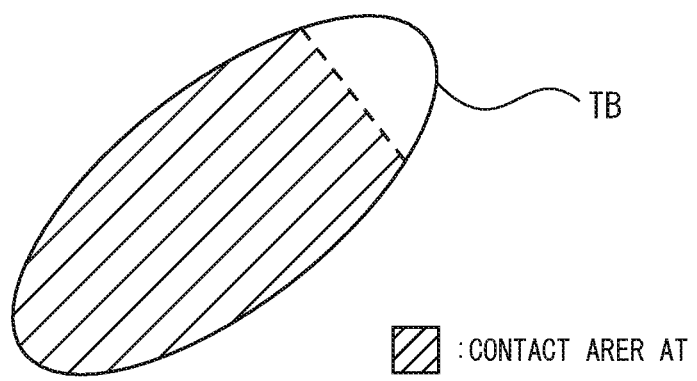
FIG. 9 is a perspective view showing a bottom surface of a tool in FIG. 8.

Referring to FIG. 1, the contact area calculating unit 32a uses the target toolpath R1 and a shape of the workpiece W before processing as the basis to calculate a size of a contact area AT at the bottom surface portion TB predicted to actually be in contact with the workpiece W during processing by the target toolpath R1. FIG. 7 is a schematic cross-sectional view showing a rotary tool T moving relative to the workpiece W while processing the workpiece W. FIG. 8 is a perspective view showing enlarged part of the rotary tool in FIG. 7. Further, FIG. 9 is a perspective view showing the bottom surface portion TB of the rotary tool T in FIG. 8. An arrow A1 in FIG. 7 shows the direction of progression of the rotary tool T moving relatively to the workpiece W along a certain toolpath.

In FIG. 7, the rotational axis TS of the rotary tool T is slanted with respect to a virtual plane VP1 vertical to the direction of progression in a direction opposite to the direction of progression. The virtual plane VP1 is a plane which passes through the tool tip point "b". In such a case, the load from the workpiece W sometimes acts on the bottom surface portion TB of the rotary tool T moving relatively with respect to the workpiece W. Therefore, in the present embodiment, in the above-mentioned case, it is judged if the toolpath is suitable. Note that, the state where the rotational axis TS is slanted in the opposite direction from the direction of progression is the state where the rotational axis TS of the rotary tool T is positioned behind the virtual plane VP1 (that is, at opposite side in direction of progression).

The hatching part in FIG. 8 shows a part contacting with the workpiece W at the outer surface of the rotary tool T moving relatively with respect to the workpiece W. Further, the hatching part in FIG. 9 shows the contact area AT at the bottom surface portion TB. The contact area calculating unit 32a in the present embodiment uses the target toolpath R1 and a shape of the workpiece W before processing as the basis to calculate the size of the contact area AT. For example, the contact area calculating unit 32a calculates the ratio of the area of the contact area AT to the area of the bottom surface portion TB. Due to this, the processing of the contact area calculating unit 32a is simplified. However, the contact area calculating unit 32a may also calculate the dimensions of the contact area AT with respect to the dimensions of the bottom surface portion TB (for example, diameter, outer circumference, etc.) For example, the contact area calculating unit 32a can calculate the ratio of the length of the outer circumference of the bottom surface portion TB at the part where the contact area AT is present. The calculated size of the contact area AT is transmitted to the judging unit 33a.

Figure 10:
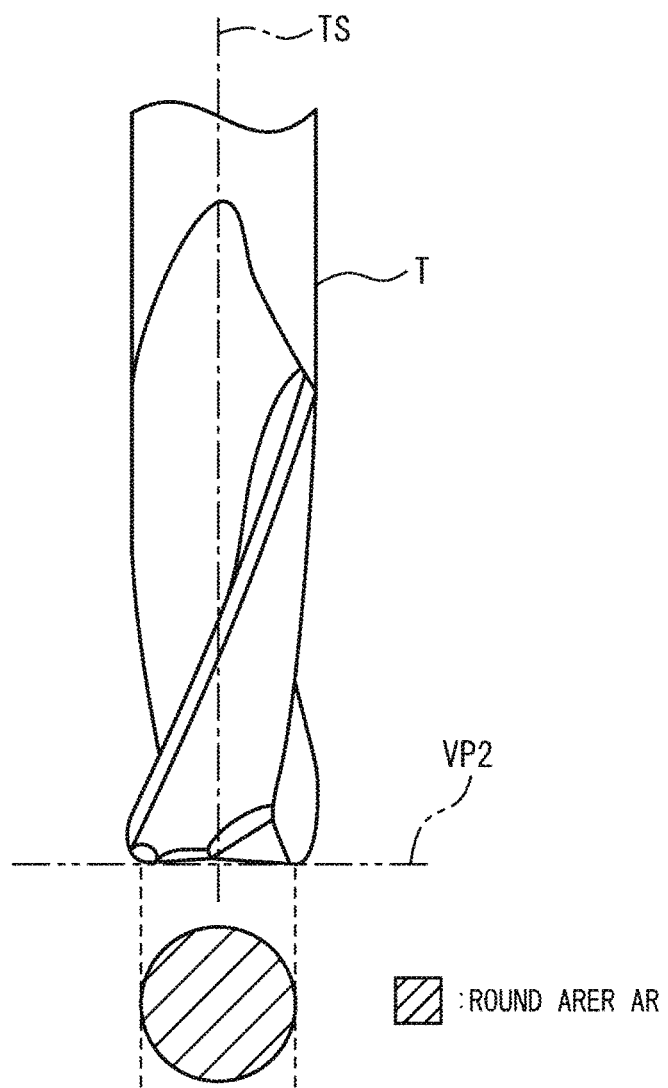
FIG. 10 is a schematic view of a first tool in the first embodiment.

Further, the contact area calculating unit 32a can convert the actual bottom surface portion TB of the rotary tool T to a round area on the virtual plane perpendicularly intersecting the rotational axis TS and calculate the size of the contact area AT at that round area. FIG. 10 is a side view of one rotary tool and a schematic view showing a round area. A radius end mill is shown. In FIG. 10, the actual bottom surface portion TB of the rotary tool T is converted to a round area AR on the virtual plane VP2 perpendicularly intersecting the rotational axis TS and matched at the center with the rotational axis TS. By converting the actual bottom surface portion TB to the round area AR in this way, it is possible to simplify the processing of the contact area calculating unit 32a when the bottom surface portion TB is not a flat shape or when the end of the tool is provided with a cutting edge.

Figure 11:
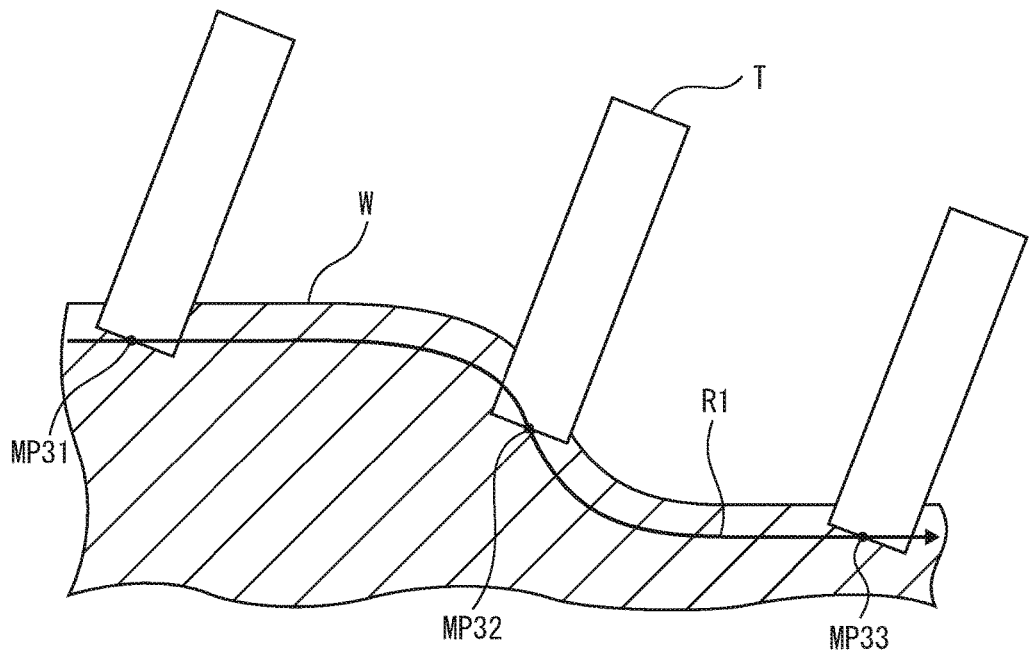
FIG. 11 is a schematic cross-sectional view showing a tool moving along a target toolpath in the first embodiment.

Referring to FIG. 1, the judging unit 33a compares the size of the contact area AT and the threshold value D4 for the respective movement points on the target toolpath R1 set for each predetermined interval. FIG. 11 is a cross-sectional view schematically showing a rotary tool T moving along the target toolpath R1 relative to the workpiece W. FIG. 11 shows movement points MP31, MP32, and MP33 on the target toolpath R1. In the present embodiment, the judging unit 33a judges that the target toolpath R1 is unsuitable when the size of the contact area AT exceeds the threshold value D4 at a movement point on the target toolpath R1. In the following explanation, a movement point with a size of the contact area AT over the threshold value D4 will particularly be referred to as an "overload movement point".

In the example of FIG. 11 at the movement point MP31 and movement point MP33, the rotary tool T proceeds from the left to the right direction and cuts using the side faces of the rotary tool T. In this case, the bottom surface portion TB does not come into contact with the workpiece, the size of the contact area AT becomes zero, and the toolpath is judged to be suitable. At the movement point MP32, the rotary tool T proceeds in the downward direction from above, the cutting is performed with the entire bottom surface portion TB of the rotary tool T being in contact with it, and the movement point MP32 is judged to be an overload movement point.

On the other hand, the judging unit 33a judges that the target toolpath R1 is suitable when the size of the contact area AT is the threshold value D4 or less at all movement points on the target toolpath R1. In this case, the judging unit 33a generates a changed toolpath R2 the same as the target toolpath R1 and sends it to the program generating unit 39a. The program generating unit 39a uses the changed toolpath R2 as the basis to generate the second processing program P2.

As shown in FIG. 3, the toolpath changing unit 35 includes a moved path generating unit 37a, auxiliary path generating unit 38, and program generating unit 39b. The moved path generating unit 37a generates a moved toolpath R3 obtained by moving the target toolpath R1 when the target toolpath R1 is judged unsuitable until the size of the contact area AT becomes the threshold value D4 or less. The moved toolpath R3 is, for example, a toolpath obtained by moving part or all of the target toolpath R1 along the rotational axis TS in a direction separating from the workpiece W.

Figure 12:
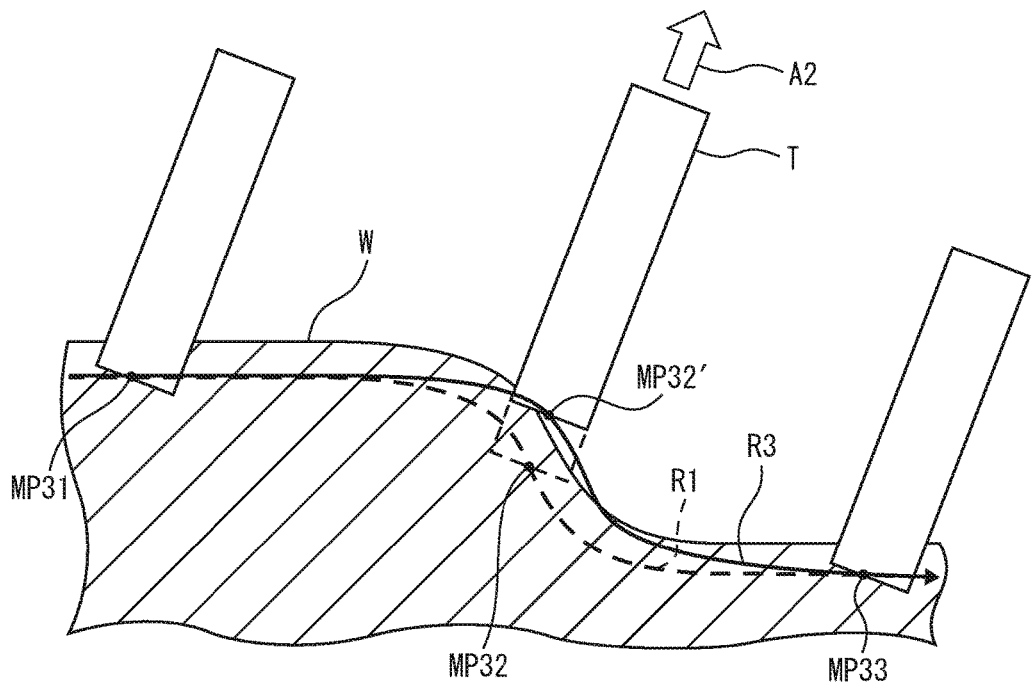
FIG. 12 is a schematic cross-sectional view showing a tool moving along a moved toolpath in the first embodiment.

FIG. 12 is a cross-sectional view schematically showing a rotary tool T moving relative to the workpiece W along the moved toolpath R3 avoiding the overload movement point MP32 of FIG. 11. The moved path generating unit 37a makes the overload movement point MP32 on the target toolpath R1 move along the rotational axis of the rotary tool T in a direction separating from the workpiece W (that is, in the direction of the arrow A2 in the figure) to generate a new movement point MP32'. The moved toolpath R3 in this case is a toolpath including the movement points MP31, MP32', and MP33.

In this way, the toolpath changing unit 35 of the present embodiment makes the overload movement point on the target toolpath R1 move along the direction of the rotational axis of the tool T so as to generate the moved toolpath R3 when it is judged that the target toolpath R1 is unsuitable. Due to this, at the moved toolpath R3, it is possible to prevent the spindle 43 or spindle head 44 from interfering with the workpiece W. However, the moved path generating unit 37a can also make the overload movement point on the target toolpath R1 move in a direction different from the direction of the rotational axis of the toolpath T. For example, the moved path generating unit 37a can also change the angle of inclination of the rotational axis TS with respect to the processing surface of the workpiece W so as to generate the new movement point MP32'.

In this regard, the processed workpiece W resulting from the moved toolpath R3 has a still uncut part remaining from the target shape. The part between the target toolpath R1 and the moved toolpath R3 in FIG. 12 is this still uncut part. Therefore, the auxiliary path generating unit 38 of the present embodiment generates an auxiliary toolpath for processing the still uncut part of the workpiece W. As shown in FIG. 3, the auxiliary path generating unit 38 includes an additional contact area calculating unit 32b, additional judging unit 33b, and additional moved path generating unit 37b.

The additional contact area calculating unit 32b has a similar function to the above-explained contact area calculating unit 32a. More specifically, the additional contact area calculating unit 32b uses the target toolpath R1 and a shape of the processed workpiece W resulting from the moved toolpath R3 as the basis to calculate the size of the contact area AT. That is, the additional contact area calculating unit 32b calculates the size of the contact area AT when processing the processed workpiece W resulting from the moved toolpath R3 generated up to the present along the target toolpath R1.

The additional judging unit 33b has a similar function to the above-mentioned judging unit 33a. That is, the additional judging unit 33b compares the size of the contact area AT calculated by the additional contact area calculating unit 32b and the threshold value D4 to judge if the target toolpath R1 is suitable. The result of judgment by the additional judging unit 33b is sent to the display unit 34. Further, when the additional judging unit 33b judges that the target toolpath R1 is suitable, it combines the moved toolpath R3 generated up to the present and the target toolpath R1 to generate the changed toolpath R2. The generated changed toolpath R2 is sent to the program generating unit 39b. The program generating unit 39b uses the changed toolpath R2 as the basis to generate the second processing program P2.

The additional moved path generating unit 37b has a similar function to the above-mentioned moved path generating unit 37a. That is, the additional moved path generating unit 37b generates the moved toolpath R3 obtained by moving the target toolpath R1 when it is judged by the additional judging unit 33b that the target toolpath R1 is unsuitable until the size of the contact area AT becomes the threshold value D4 or less.

Next, the additional contact area calculating unit 32b calculates the size of the contact area AT when processing the previously processed workpiece W by the target toolpath R1 in the same way as the previous time. Next, the additional judging unit 33b judges if the target toolpath R1 is suitable for processing the previously processed workpiece W in the same way as the previous time. When it is judged that the target toolpath R1 is unsuitable, the moved path generating unit 37b generates a moved toolpath R3 again in the same way as the previous time.

In this way, the auxiliary path generating unit 38 repeatedly generates a moved toolpath R3 until the size of the contact area AT becomes the threshold value D4 or less. The auxiliary toolpath is a toolpath combining the one or more generated moved toolpaths R3 and the target toolpath R1. Alternatively, the auxiliary toolpath is sometimes a toolpath configured from a target toolpath R1. Further, the judging unit 33b combines all of the moved toolpaths R3 generated by the moved path generating units 37a, 37b and the target toolpath R1 to generate a changed toolpath R2. The generated changed toolpath R2 is sent to the program generating unit 39b.

Referring to FIG. 1 and FIG. 3, the CAM system 20 of the present embodiment is provided with a display unit 34. The display unit 34 displays the results of judgment by the judging units 33a, 33b, information of the target toolpath R1, and information of the changed toolpath R2, etc. on a screen.

Figure 13:
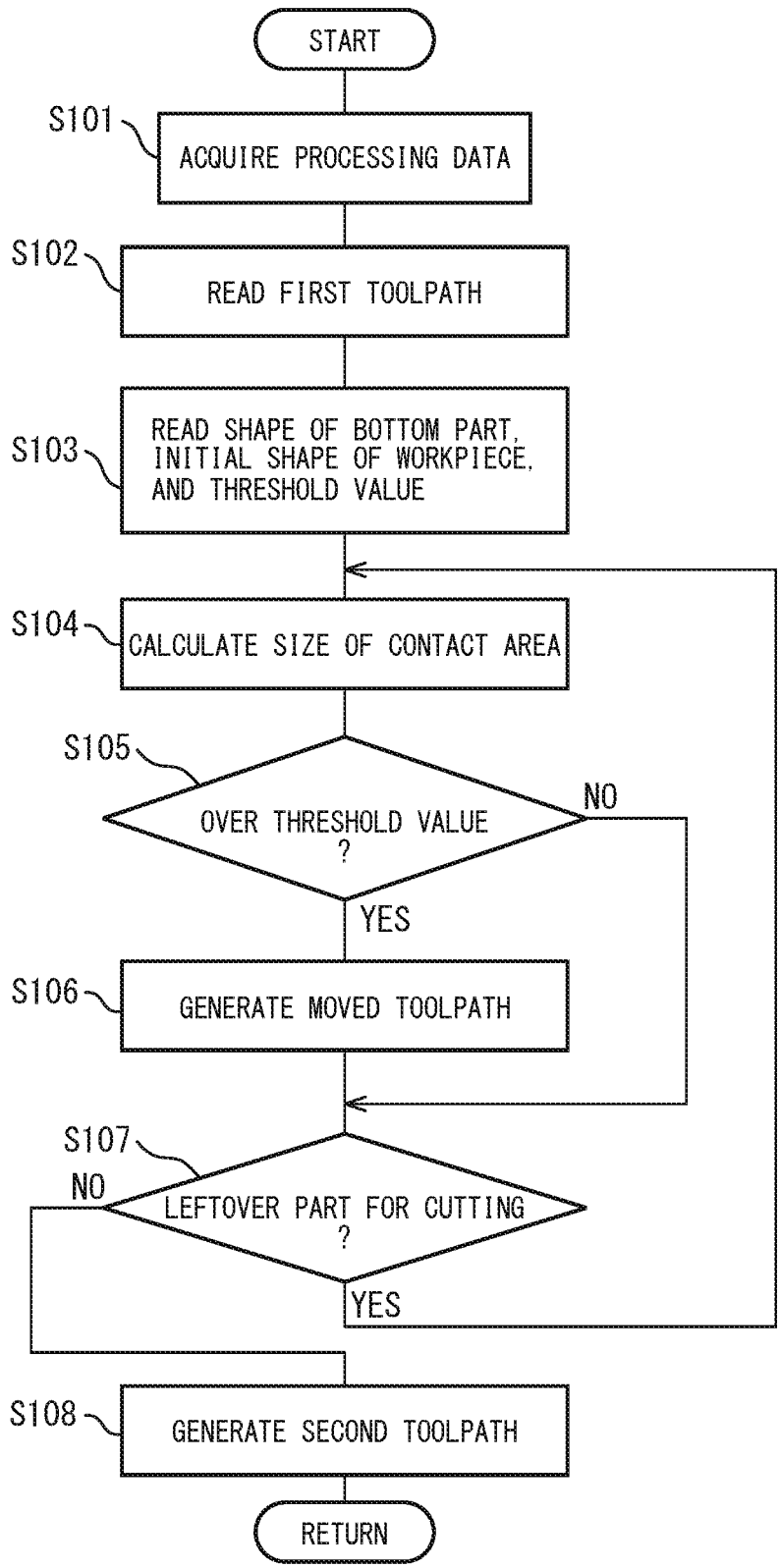
FIG. 13 is a flow chart of control for generating a toolpath by the CAM system in the first embodiment.

Next, referring to FIG. 13 to FIG. 16, the operation of the processing program changing unit 30 in the present embodiment will be explained in brief. FIG. 13 is a flow chart showing the routine of the processing for generating the changed toolpath R2 by the processing program changing unit 30. As shown in FIG. 13, the processing program changing unit 30 first acquires processing data of the workpiece including the target shape data D1, initial shape data D2, and tool shape data D3 (step S101). Afterward, the processing program changing unit 30 reads the target toolpath R1 from the first processing program P1 (step S102).

Figure 14:
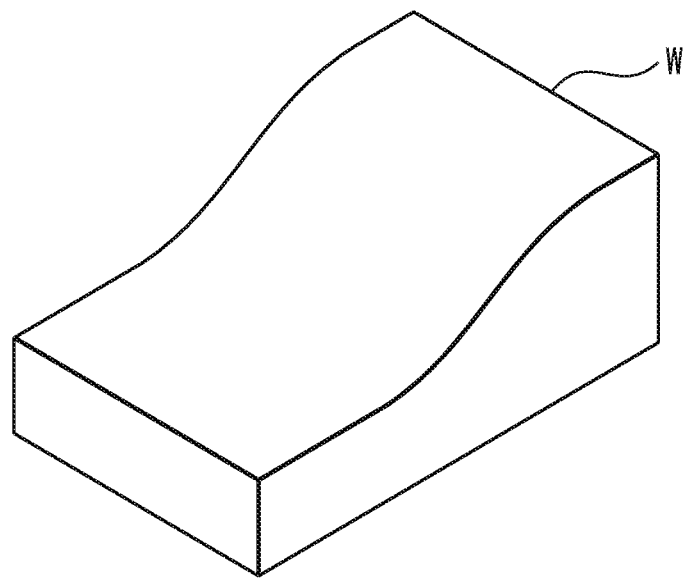
FIG. 14 is a perspective view showing a target shape of a workpiece in the first embodiment.
Figure 15:
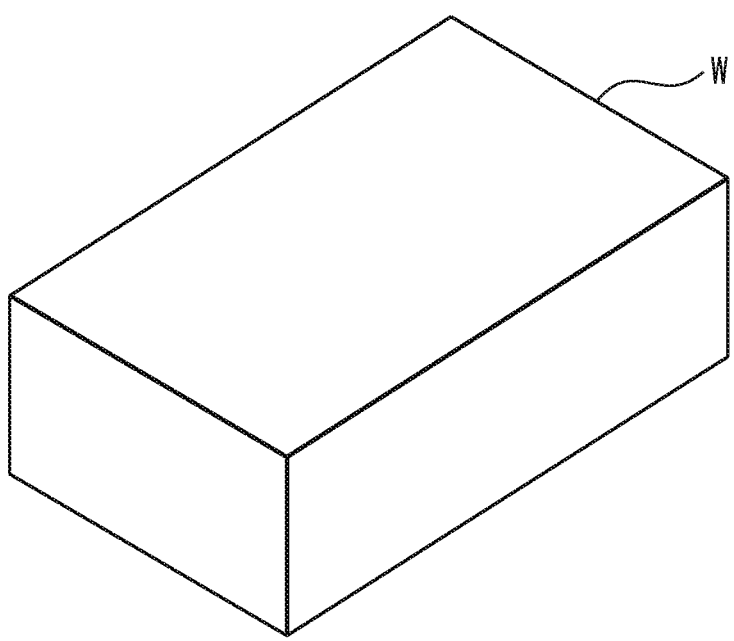
FIG. 15 is a perspective view showing an initial shape of a workpiece in the first embodiment.

Afterward, the processing program changing unit 30 reads the target shape of the workpiece W, the shape of the bottom surface portion TB of the rotary tool T, the initial shape of the workpiece W, and the threshold value D4 (step S103). The target shape of the workpiece W is included in the target shape data D1. The shape of the bottom surface portion TB is included in the tool shape data D3. The initial shape of the workpiece W is included in the initial shape data D2. FIG. 14 is a perspective view showing the target shape of the workpiece W, while FIG. 15 is a perspective view showing the initial shape of the workpiece W.

Afterward, the processing program changing unit 30 performs the calculation step of using the target toolpath R1 and the initial shape of the workpiece W as the basis to calculate the contact area AT at the bottom surface portion TB of the rotary tool T (step S104). More specifically, at the calculation step, it calculates the ratio of the area of the contact area AT to the area of the bottom surface portion TB as the size of the contact area AT. Further, at the calculation step, it converts the actual bottom surface portion TB to a round area AR on a virtual plane perpendicularly intersecting the rotational axis TS and matched with the rotational axis TS at its center and calculates the size of the contact area AT at that round area AR.

Afterward, the processing program changing unit 30 performs a judging step judging if the size of the contact area AT calculated at the calculation step (step S104) exceeds the threshold value D4 (step S105). More specifically, at the judging step, it is judged that the target toolpath R1 is unsuitable if the size of the contact area AT exceeds the threshold value D4 at any location of the target toolpath R1. On the other hand, if the size of the contact area At is the threshold value D4 or less at all locations of the target toolpath R1, it is judged that the target toolpath R1 is suitable. If the size of the contact area AT does not exceed the threshold value D4 (step S105: NO), the processing program changing unit 30 proceeds to step S107 as is.

As opposed to this, when the size of the contact area AT is over the threshold value D4 (step S105: YES), the processing program changing unit 30 performs a moved path generating step generating the moved toolpath R3 obtained by moving the target toolpath R1 (step S106). The moved toolpath R3 is, for example, a toolpath obtained by moving all or part of the target toolpath R1 along the rotational axis TS in a direction away from the workpiece W. The abovementioned calculation step (step S104), judging step (step S105), and moved path generating step (step S106) are executed at one time for all movement points on the target toolpath R1. However, these steps may also be repeated performed for each movement point on the target toolpath R1.

Figure 16:
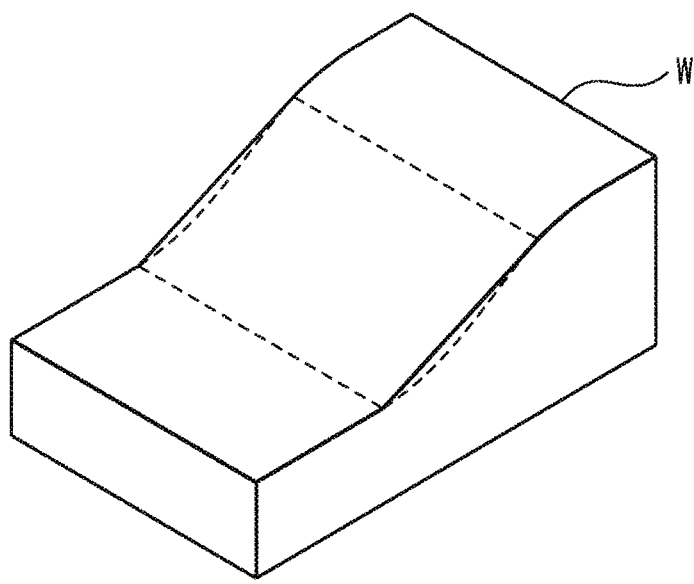
FIG. 16 is a perspective view showing the shape of the workpiece in the first embodiment in the middle of processing.

After that, the processing program changing unit 30 proceeds to step S107. At step S107, the processing program changing unit 30 judges if there is a still uncut part from the target shape at the workpiece W. When there is no still uncut part at the workpiece W (step S107: NO), the processing program changing unit 30 outputs the target toolpath R1 as the changed toolpath R2 (step S108). On the other hand, if there is a still uncut part at the workpiece W (step S107: YES), the processing program changing unit 30 performs an auxiliary path generation step for generating an auxiliary toolpath for processing the still uncut part remaining at the workpiece W. FIG. 16 is a perspective view showing the shape of the workpiece W in the middle of processing. The shape shown by the solid lines in FIG. 16 is the shape of the workpiece processed up to the present. Further, the shape shown by the broken lines is part of the target shape. That is, the part above the area which is surrounded by the broken lines in the workpiece W of FIG. 16 is a still uncut part of the workpiece W.

At the auxiliary path generation step, the processing program changing unit 30 uses the target toolpath R1 and a shape of the processed workpiece W resulting from the moved toolpath R3 generated up to the present as the basis to again perform the additional calculation step (step S104), additional judging step (step S105), and additional moved path generating step (step S106). After that, when it is judged that there is a still uncut part (step S107: YES), the processing program changing unit 30 again proceeds to step S104. In this way, the processing program changing unit 30 repeats the additional calculation step (step S104), additional judging step (step S105), and additional moved path generating step (step S106) until the size of the contact area AT calculated by the additional judging step becomes the threshold value D4 or less, that is, until there is no longer any still uncut part in the processed workpiece W resulting from the toolpaths generated up to the present. Such a series of steps form the auxiliary path generation step. Each time the additional moved path generating step is executed, an additional moved toolpath R3 is generated. The auxiliary toolpath in this case is a toolpath combining the one or more generated additional moved toolpaths R3 and the target toolpath R1.

Further, if the size of the contact area AT calculated by the additional judging step becomes the threshold value D4 or less, that is, if there is no longer any still uncut part at the processed workpiece W resulting from the toolpaths generated up to the present, the processing program changing unit 30 proceeds to step S108. At step S108, the processing program changing unit 30 combines the moved toolpaths R3 and target toolpath R1 generated up to the present so as to generate the changed toolpath R2. Through the above such processing, the toolpath evaluation method and toolpath generation method of the present invention are performed.

In the above way, the processing program changing unit 30 in the CAM system 20 of the present embodiment calculates the size of the contact area AT at the bottom surface portion TB which is predicted to actually be in contact with the workpiece W during processing by the target toolpath R1. Further, the processing program changing unit 30 judges that the target toolpath R1 is unsuitable if the calculated size of the contact area AT exceeds a threshold value D4. Therefore, according to the CAM system 20 of the present embodiment, it is possible to suitably evaluate whether an excessive load would be applied to the rotary tool during processing of the workpiece by the machine tool 40. Further, according to the CAM system 20 of the present embodiment, a moved toolpath R3 can be generated for avoiding excessive load being applied to the rotary tool.

In this regard, in the toolpath generation device and toolpath generation method of the present embodiment, the toolpath is changed in accordance with a predetermined method. For this reason, the moved toolpath R3 sometimes includes an undesirable path. For example, sometimes the moved toolpath R3 will include a path in which the direction of progression of the rotary tool T is reversed or will include a bent path. In the present embodiment, in such a case, the moved toolpath R3 is corrected to generate a corrected toolpath R3'.

Figure 17:
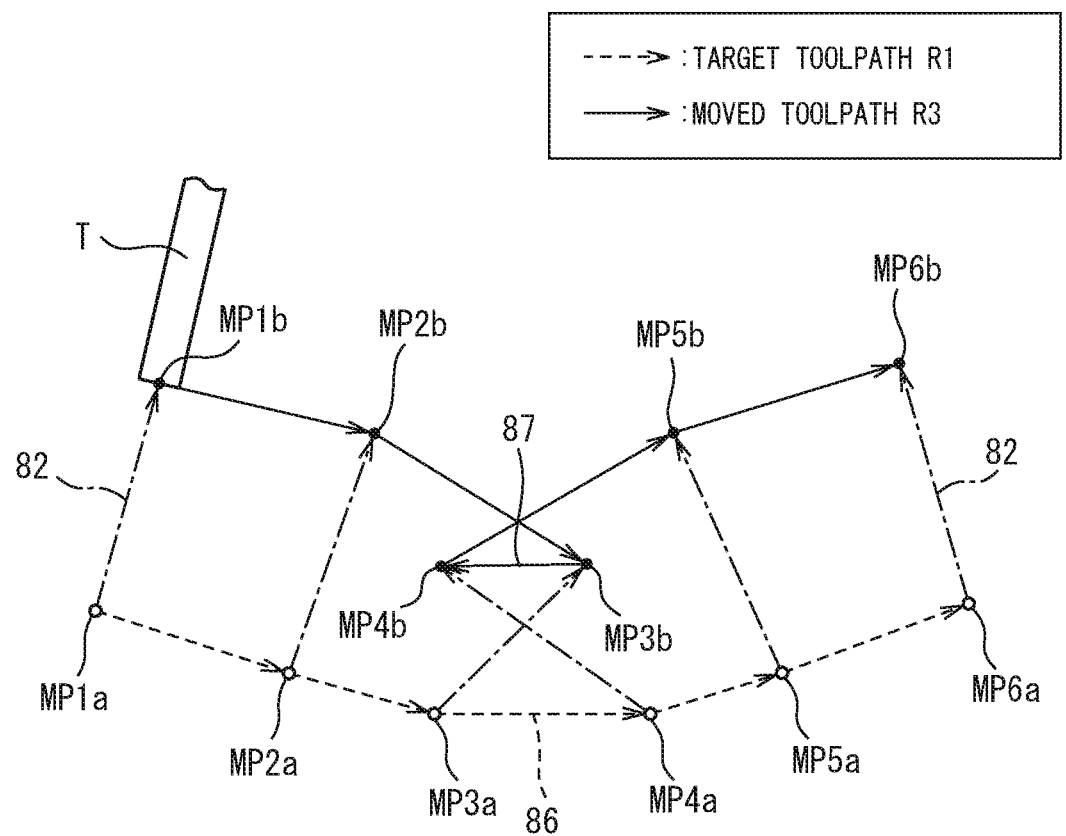
FIG. 17 is a view explaining a target toolpath and a moved toolpath.

FIG. 17 is a schematic view of a moved toolpath R3 in which the direction of progression of the rotary tool T greatly changes. The respective toolpaths will be explained by points of movement and arrow marks. The target toolpath R1 includes the movement points MP1$a$ to MP6$a$. For the target toolpath R1, the moved toolpath R3 is set. As shown by the arrow 82, the respective movement points MP1$a$ to MP6$a$ change to the movement points MP1$b$ to MP6$b$ by movement along the direction of the rotational axis of the rotary tool T.

In this embodiment, at the target toolpath R1, the movement point MP3$a$ of the target toolpath R1 moves to the movement point MP3$b$. Further, the movement point MP4$a$ of the target toolpath R1 moves to the movement point MP4$b$. In this regard, the angle of inclination of the rotary tool T with respect to the workpiece greatly changes on the path from the movement point MP3$a$ to the movement point MP4$a$. The direction of progression of the rotary tool T with respect to the workpiece at the time of movement from the movement point MP3$a$ to the movement point MP4$a$ is shown by the arrow 86. Further, the direction of progression of the rotary tool T with respect to the workpiece when moving from the movement point MP3$b$ to the movement point MP4$b$ is shown by the arrow 87.

Figure 18:
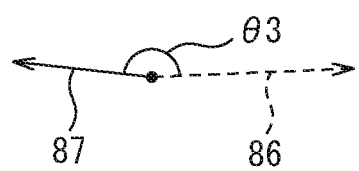
FIG. 18 is a view explaining a direction of progression of a rotary tool in a target toolpath and a direction of progression of a rotary tool in a moved toolpath.

FIG. 18 shows a schematic view explaining the direction of progression of the rotary tool T at the target toolpath R1 and the direction of progression of the rotary tool T at the moved toolpath R3. The arrows of the direction of progression relating to the movement points MP3$a$, MP4$a$, MP3$b$, and MP4$b$ in FIG. 17 will be picked up here. Referring to FIG. 17 and FIG. 18, the direction of progression of the rotary tool T at the target toolpath R1 is shown by the arrow 86. Further, the direction of progression of the rotary tool T at the moved toolpath R3 is shown by the arrow 87. It is learned that the direction of progression of the rotary tool T shown by the arrow 86 and the direction of progression of the rotary tool T shown by the arrow 87 are substantially opposite in direction. That is, the direction of progression of the rotary tool T is inverted. If the direction of progression of the rotary tool T rapidly changes with respect to the workpiece, there is the problem that a large acceleration is caused and excessive force is applied to the machine tool. Further, the processing precision is liable to fall.

In the present embodiment, when the direction of progression of the rotary tool T at the moved toolpath R3 rapidly changes from the direction of progression of the rotary tool T at the target toolpath R1, the moved toolpath R3 is corrected. In the present embodiment, it is judged if there is a specific path where the angle θ3 showing the change of the direction of progression of the rotary tool T becomes a judgment angle or more. In the present embodiment, the judgment angle is set to 90°. If there is a specific path where the direction of progression of the rotary tool T changes by a 90° or more angle, correction is performed to eliminate the movement point corresponding to the specific path.

In the example shown in FIG. 17 and FIG. 18, at movement from the movement point MP3b to the movement point MP4b in the moved toolpath R3, the direction of progression of the rotary tool T changes by 90° or more. For this reason, the path shown by the arrow 87 can be judged to be a specific path.

Figure 19:
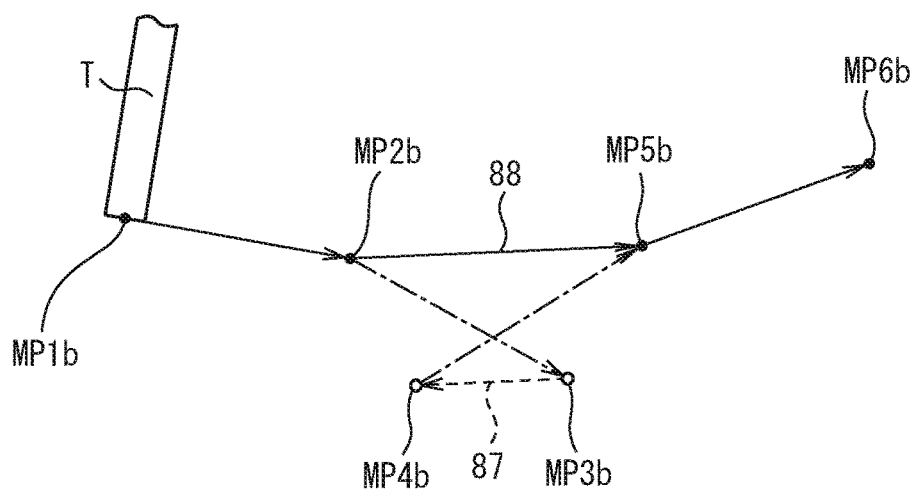
FIG. 19 is a view explaining a moved toolpath and a corrected toolpath.

FIG. 19 shows a schematic view explaining correction of the moved toolpath R3. The movement points corresponding to the specific path include the starting point of the arrow 87, that is, the movement point MP3b, and the ending point of the arrow 87, that is, the movement point MP4b. For this reason, the movement point MP3b and movement point MP4b are excluded. Further, as shown by the arrow 88, a short path is generated connecting the movement point MP2b and the movement point MP5b. The path including the movement points MP1b, MP2b, MP5b, and MP6b corresponds to the corrected toolpath R3'. In this way, it is possible to exclude a path where the direction of progression rapidly changes from the moved toolpath R3. By this method, it is possible to keep the direction of progression of the rotary tool T from rapidly changing with respect to the workpiece and keep down the load on the machine tool. Further, it is possible to keep down the drop in the processing precision. Here, the short path is checked for interference. If there is any interference, the movement point MP3b and movement point MP4b are not excluded.

Figure 20:
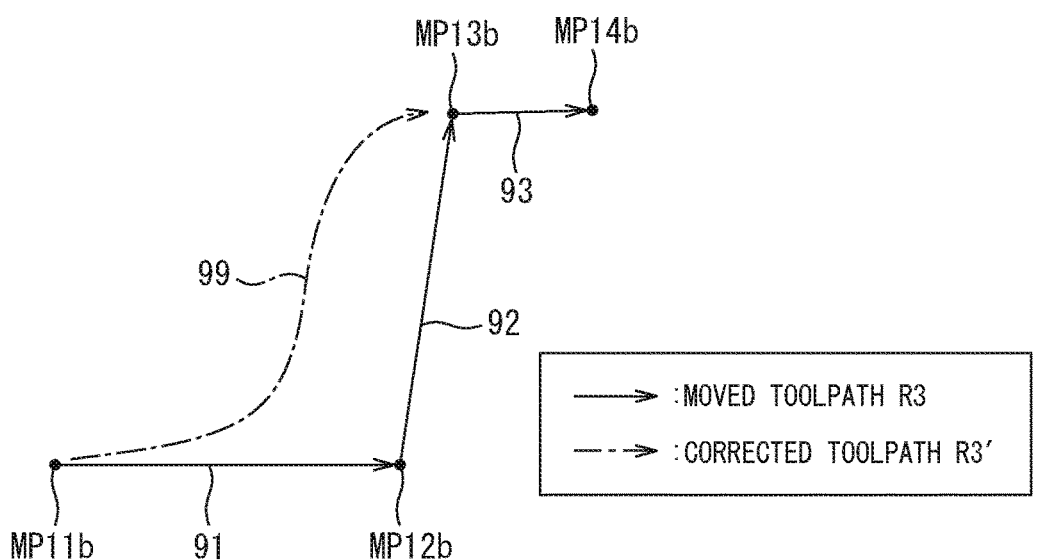
FIG. 20 is a view explaining a moved toolpath and another corrected toolpath.

Next, another method of correction of the moved toolpath R3 will be explained. FIG. 20 shows a schematic view of a moved toolpath R3 with a bent toolpath. In the example shown in FIG. 20, the movement points MP11b to MP14b are shown. The moved toolpath R3 is shown by the arrow 91, arrow 92, and arrow 93. Here, the moved toolpath R3 proceeds in the direction shown by the arrow 91, then proceeds in the direction shown by the arrow 92. At this time, the moved toolpath R3 is bent. That is, the toolpath is bent. Further, the toolpath is bent when proceeding in the direction shown by the arrow 92, then proceeding in the direction shown by the arrow 93.

As another method of correction, it is judged if the moved toolpath R3 includes a bent path. Further, when the moved toolpath R3 includes a bent path, this is corrected to change the bent path to a curved path. In the example of FIG. 20, the bent toolpath shown by the arrows 91, 92, and 93 is corrected to the curved toolpath shown by the arrows 99 and 93. The path bent toward the outside of the workpiece is changed to a recessed curved path. The path bent toward the inside of the workpiece is changed to a projecting curved path. That is, the path is changed so that corrected toolpath is positioned at the outside of the workpiece from the moved toolpath. The path shown by the arrow 99 corresponds to the corrected toolpath R3'.

Figure 21:
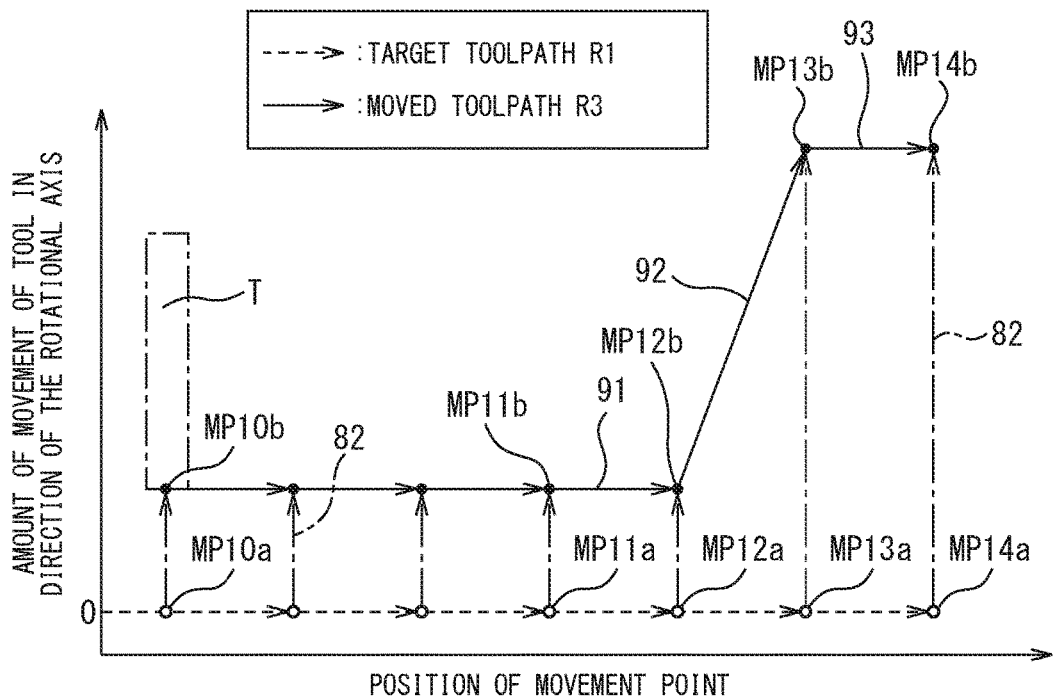
FIG. 21 is a second graph showing an amount of movement in a direction of a rotational axis of a rotary tool with respect to the positions of movement points.

FIG. 21 shows a graph of the amount of movement in the direction of the rotational axis of the rotary tool T with respect to the positions of the movement points. In this embodiment, as shown by the arrow 82, the target toolpath R1 is moved whereby the moved toolpath R3 is generated. The target toolpath R1 includes the movement points MP10a to MP14a. The moved toolpath R3 includes the movement points MP10b to MP14b. Here, the toolpath shown by the arrow 92 is bent from the toolpath shown by the arrow 91. Further, the toolpath shown by the arrow 93 is bent from the toolpath shown by the arrow 92. The movement point MP12b and movement point MP13b are bent points. For this reason, the toolpath from the movement point MP11b to the movement point MP13b is corrected.

Figure 22:
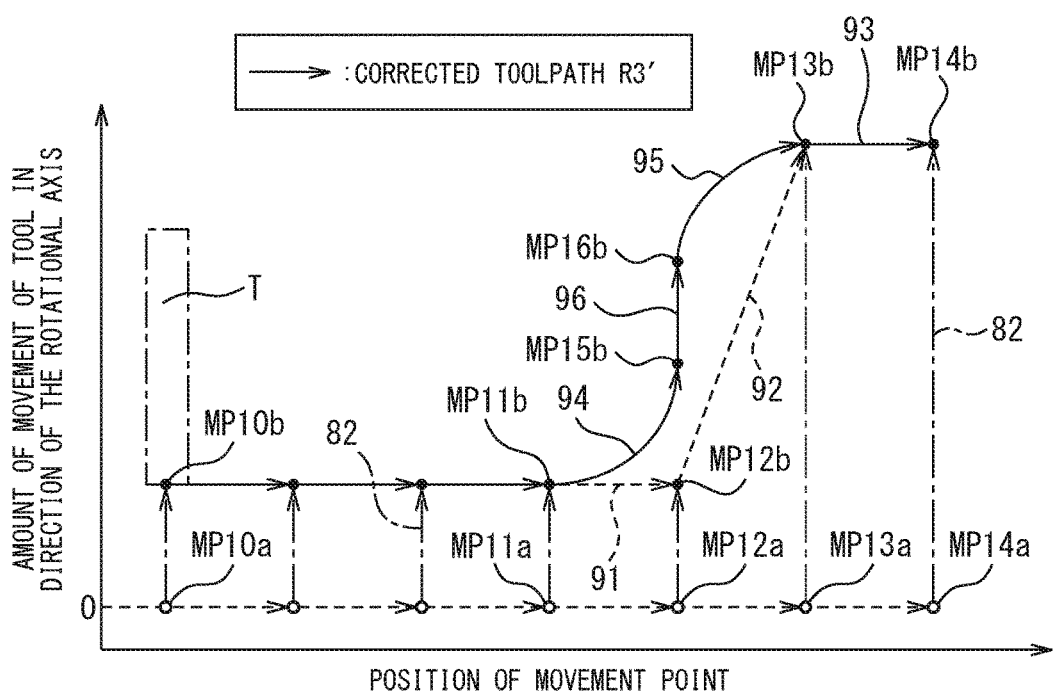
FIG. 22 is a third graph showing an amount of movement in a direction of a rotational axis of a rotary tool with respect to the positions of movement points.

FIG. 22 shows a graph of the corrected toolpath R3' obtained by correcting the moved toolpath R3. The toolpath shown by the arrow 92 where the movement point MP13b becomes a bent point is corrected to a projecting arc shaped toolpath. As shown by the arrow 95, an arc shape toolpath is generated so as to pass through the movement point MP13b. The toolpath shown by the arrow 91 where the movement point MP12b becomes a bent point is corrected to a recessed arc shaped toolpath. As a result, a movement point MP15b and movement point MP16b are newly generated. Further, as shown by the arrow 96, a toolpath from the movement point MP15b to the movement point MP16b is generated.

The diameter of the arc when generating the corrected toolpath R3' can be any value set by the user. For example, the diameter of the arc shown by the arrow 94 and the diameter of the arc shown by the arrow 95 can be set to be the same as the tool diameter.

Next, for the respective corrected movement points, the corrected amounts of movement in the direction of the rotational axis of the rotary tool T are stored. Referring to FIG. 22, the respective movement points are made to move in the direction of the rotational axis of the rotary tool T by the stored amounts of movement to generate the movement points of the corrected toolpath R3. The positions of the movement point MP15b and movement point MP16b newly generated at the correction can, for example, by set by interpolation of the movement point MP11b and the movement point MP13b. It is possible to generate a corrected toolpath R3' in this way.

In the above way, by correcting the amount of movement of the rotary tool T in the direction of the rotational axis, a bent path can be changed to a curved path. It is possible to keep the direction of progression of the rotary tool T with respect to the workpiece W from sharply changing and keep down the load on the machine tool. Further, it is possible to keep down the drop in the processing precision. Note that by making the bent path a curved path, when the change in direction of movement of the rotary tool T becomes large, no correction is performed.

Figure 23:
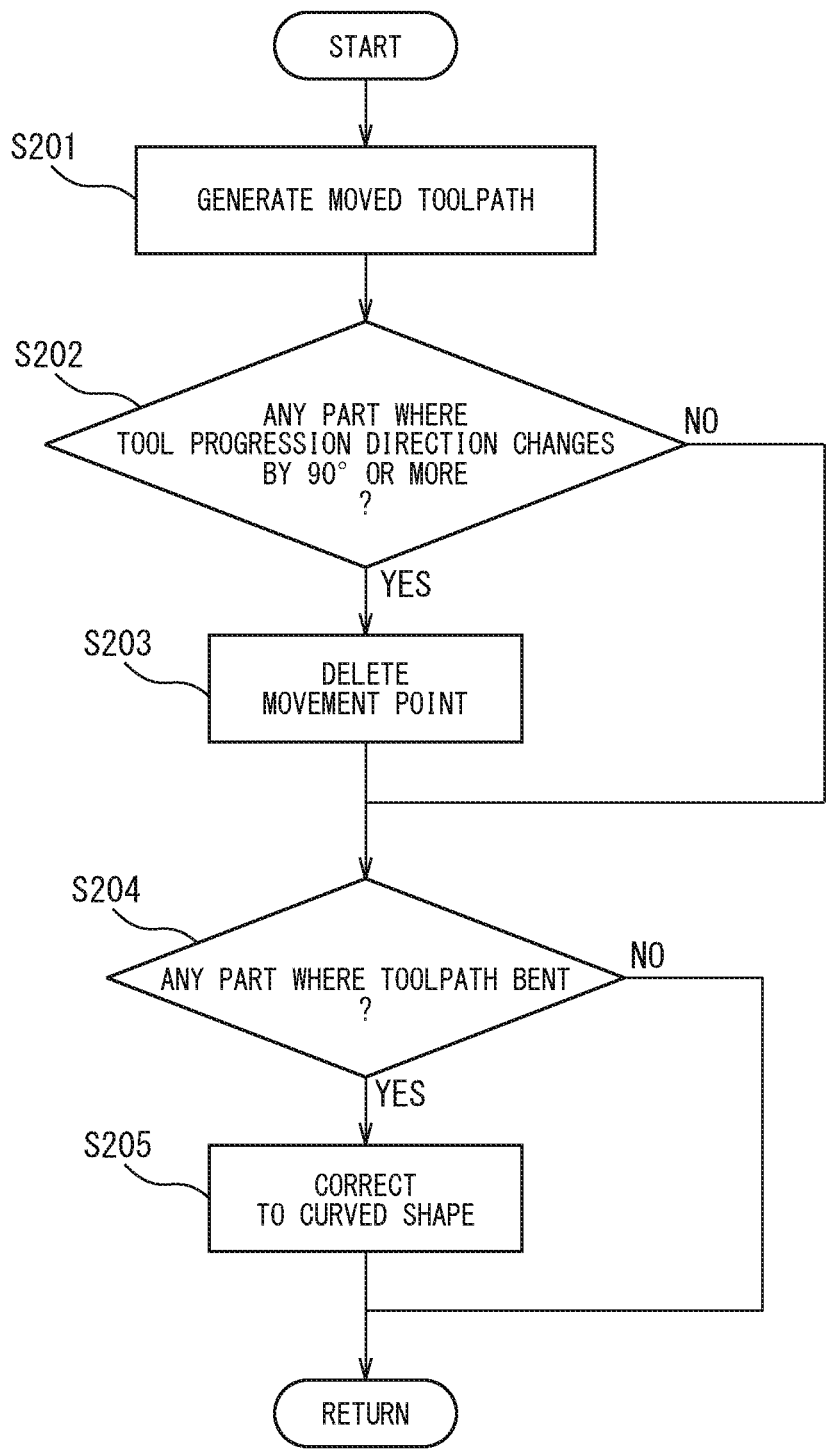
FIG. 23 is a flow chart of control for correcting a moved toolpath to generate a corrected toolpath by the CAM system in the first embodiment.

FIG. 23 is a flow chart showing the routine of processing for correcting the moved toolpath R3 by the processing program changing unit 30 in the present embodiment. This processing can be performed as step S106 shown in for example FIG. 13. As shown in FIG. 23, the processing program changing unit 30 first generates a moved toolpath R3 obtained by movement in the direction of the rotational axis of the rotary tool T (step S201).

Afterward, the processing program changing unit 30 judges if there is a specific path where the direction of progression of the rotary tool T in the moved toolpath R3 changes by 90° or more from the direction of progression of the rotary tool T in the target toolpath R1 (step S202). When there is no specific path (step S202: NO), the processing program changing unit 30 proceeds to step S204. When there is a specific path (step S202: YES), the processing program changing unit 30 proceeds to step S203. At step S203, the processing program changing unit 30 deletes the movement points corresponding to the specific path.

Afterward, the processing program changing unit 30 judges if the moved toolpath R3 includes a bent part (step S204). If the moved toolpath R3 does not have a bent part (step S204: NO), the processing program changing unit 30 ends the series of processing. If the moved toolpath R3 has a bent part (step S204: YES), the processing program changing unit 30 proceeds to step S205. At step S205, the processing program changing unit 30 corrects the bent path to a curved path. After that, the processing program changing unit 30 ends the series of processing.

Figure 24:
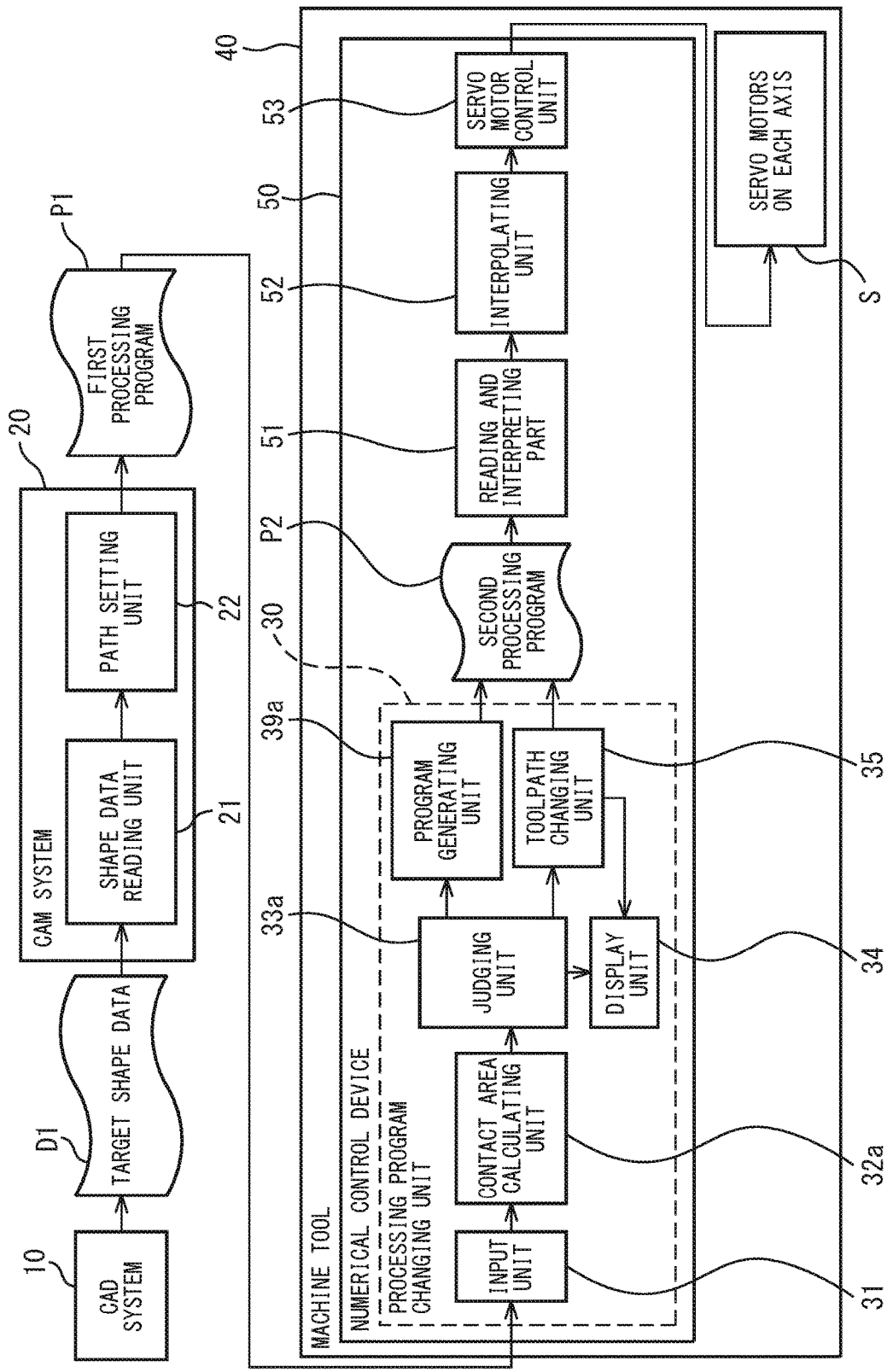
FIG. 24 is a block diagram of a CAM system and machine tool in a second embodiment.

Next, a second embodiment of the present invention will be explained. FIG. 24 is a block diagram showing the basic configuration of a processing system in the present embodiment. In the present embodiment, the processing program changing unit 30 functioning as a toolpath generation device is mounted not at the CAM system 20, but at the numerical control device 50 of the machine tool 40. Further, in the present embodiment, the first processing program P1 is output from the CAM system 20, while the second processing program P2 is generated inside the machine tool 40.

In FIG. 24, the reading and interpreting part 51 reads and interprets the second processing program P2 and sends out a movement command to the interpolating unit 52. The interpolating unit 52 calculates the position instruction value for each interpolation cycle and sends the position instruction value to the servo motor control unit 53. The servo motor control unit 53 uses the position instruction value as the basis to calculate the amounts of movement of the different movement axes so as to drive the servo motors S on each axis. The functions and configurations of the rest of the parts in the processing system of the present embodiment are similar to those of the above explained first embodiment.

The processing program changing unit 30 in the numerical control device 50 of the present embodiment calculates the size of the contact area AT at the bottom surface portion TB predicted to actually be in contact with the workpiece W during processing by the target toolpath R1. Further, the processing program changing unit 30 judges that the target toolpath R1 is unsuitable when the calculated size of the contact area AT exceeds the threshold value D4. Therefore, according to the numerical control device 50 of the present embodiment, in the same way as the CAM system 20 of the first embodiment explained before, it is possible to suitably evaluate whether an excessive load would be applied to the rotary tool during processing of the workpiece by the machine tool 40. Further, according to the numerical control device 50 of the present embodiment, a moved toolpath R3 for avoiding excessive load being applied to the rotary tool can be generated.

Next, a third embodiment of the present invention will be explained. The processing system of the present embodiment has functions and configurations similar to the processing system of the first embodiment other than the contact area calculating units 32a, 32b, judging units 33a, 33b, and moved path generating units 37a, 37b (see FIG. 1 and FIG. 3). Further, in the present embodiment, a center area AC at the bottom surface portion TB of the rotary tool T is determined in advance.

Figure 25:
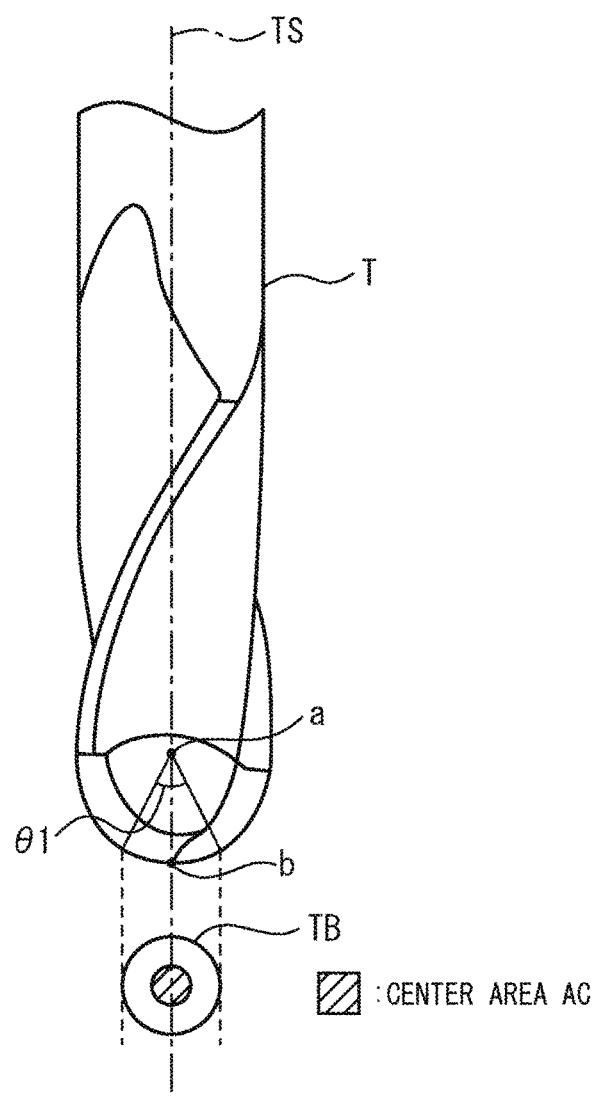
FIG. 25 is a schematic view of one tool in a third embodiment.

FIG. 25 is a schematic view showing the side surface and bottom surface of the rotary tool T in the present embodiment. A ball end mill is shown. In the present embodiment, the center area AC at the bottom surface portion TB of the rotary tool T is determined in advance. In particular, in FIG. 25, the center area AC positioned near the rotational axis of the rotational axis TS at the bottom surface portion TB is determined in advance. The information relating to this center area AC is stored in the tool shape data D3.

In the present embodiment, the contact area calculating unit 32a performs a step of using the target toolpath R1 and a shape of the workpiece W before processing as the basis to find the contact area AT at the bottom surface portion TB. The judging unit 33a performs a step of judging the target toolpath R1 to be unsuitable when at least part of the contact area AT overlaps the center area AC at the bottom surface portion TB at any location of the target toolpath R1. The moved path generating unit 37a performs the step of generating a moved toolpath R3 moving the toolpath R1 until the contact area AT as a whole separates from the center area AC when it is judged that the target toolpath R1 is unsuitable.

Similarly, the additional contact area calculating unit 32b performs the step of using the target toolpath R1 and a shape of the processed workpiece W resulting from the moved toolpath R3 as the basis to find the contact area AT. The additional judging unit 33b performs the step of judging the target toolpath R1 as unsuitable when at least part of the contact area At found by the additional contact area calculating unit 32b overlaps the center area AC. Further, the additional moved path generating unit 37b performs the step of generating the moved toolpath R3 obtained by moving the target toolpath R1 when it is judged by the additional judging unit 33b that the target toolpath R1 is unsuitable until the contact area AT as a whole separates from the center area AC. These additional steps are repeated until the contact area AT as a whole found by the additional contact area calculating unit 32b separates from the center area AC.

Therefore, according to the CAM system 20 of the present embodiment, in the same way as the above-mentioned first embodiment, it is possible to suitably evaluate if an excessive load would be applied to the rotary tool during processing of the workpiece by the machine tool 4. Further, according to the CAM system 20 of the present embodiment, a moved toolpath R3 for avoiding an excessive load being applied to the rotary tool can be generated. Furthermore, in the present embodiment, the toolpath is judged unsuitable when the contact area AT at the bottom surface portion TB overlaps the center area AC, so the chance of the workpiece being cut by the center area AC of the bottom surface portion TB where the circumferential speed at the time of processing becomes particularly small can be reduced.

Next, a fourth embodiment of the present invention will be explained. The processing system of the present embodiment has functions and configurations similar to the processing system of the second embodiment except for the contact area calculating units 32a, 32b, judging units 33a, 33b, and moved path generating units 37a, 37b (see FIG. 3 and FIG. 24). The contact area calculating units 32a, 32b of the present embodiment have functions similar to the contact area calculating units 32a, 32b of the third embodiment. The judging units 33a, 33b of the present embodiment have functions similar to the judging units 33a, 33b of the third embodiment. The moved path generating units 37a, 37b of the present embodiment have functions similar to the moved path generating units 37a, 37b of the third embodiment. Further, in the present embodiment, the center area AC at the bottom surface portion TB of the rotary tool T is determined in advance (see FIG. 25).

Therefore, according to the numerical control device 50 of the present embodiment, in the same way as the above embodiments, it is possible to suitably evaluate if excessive load would be applied to the rotary tool during processing of the workpiece by the machine tool 40. Further, according to the numerical control device 50 of the present embodiment, it is also possible to generate a moved toolpath R3 for avoiding excessive load being applied to the rotary tool. Furthermore, in the present embodiment, when the contact area AT at the bottom surface portion TB overlaps the center area AC, the toolpath is judged unsuitable, so the danger of the workpiece being cut by the center area AC of the bottom surface portion TB where the circumferential speed at the time of processing becomes particularly small can be reduced.

In the above embodiments, a machine tool having five axes of movement is shown, but the invention is not limited to this. It is possible to use any machine tool where the tool moves relative to the workpiece. For example, the present invention can also be applied to a three-axis machine tool which has three linear drive axes. Further, in the above embodiments, a flat end mill or radius end mill or ball end mill or other rotary tool is illustrated, but any rotary tool which moves relative to the workpiece to process the workpiece can be employed. For example, the present invention can be applied to various milling tools and other rotary tools.

The above embodiments can be suitably combined. In the above figures, the same or equal parts are assigned the same notations. Note that the above embodiments are illustrations and do not limit the invention. Further, the embodiments include changes shown in the claims.

REFERENCE SIGNS LIST 30. processing program changing unit
32a. contact area calculating unit
32b. contact area calculating unit
33a. judging unit
33b. judging unit
35. toolpath changing unit
37a. moved path generating unit
37b. moved path generating unit
38. auxiliary path generating unit
39a. program generating unit
39b. program generating unit
a. tool center point
b. tool tip point
AC. center area
AR. round area
AT. contact area
D1. target shape data
D2. initial shape data
D3. tool shape data
D4. threshold value
P1. first processing program
P2. second processing program
R1. target toolpath
R2. changed toolpath
R3. moved toolpath
R3'. corrected toolpath
TB. bottom surface portion
TS. rotational axis

The invention claimed is:

1. A toolpath generation method generating a toolpath when a rotary tool moves relative to a workpiece while processing the workpiece, the toolpath generation method comprising:
a calculation step of using a predetermined target toolpath and a shape of the workpiece before processing by the target toolpath as a basis to calculate a size of a contact area predicted to actually be in contact with the workpiece during processing by the target toolpath at a bottom surface portion of the rotary tool intersecting a rotational axis of the tool, wherein the bottom surface portion is in a form of a flat shaped end face or a curved end face included in a virtual cone defined by a curved bottom and a vertex on the rotational axis; and
a moved path generating step of generating a moved toolpath obtained by moving the target toolpath when the size of the contact area exceeds a predetermined threshold value until the size of the contact area becomes the threshold value or less.

2. The toolpath generation method according to claim 1, further comprising an auxiliary path generation step of generating an auxiliary toolpath for processing a still uncut part remaining at the processed workpiece resulting from the moved toolpath.

3. The toolpath generation method according to claim 1, wherein the moved toolpath is a toolpath obtained by moving the target toolpath along the rotational axis of the tool in a direction away from the workpiece.

4. The toolpath generation method according to claim 2, wherein the auxiliary path generation step comprises:
an additional calculation step of using the target toolpath and a shape of the processed workpiece resulting from the moved toolpath as a basis to calculate the size of the contact area; and
an additional moved path generating step of generating a moved toolpath obtained by moving the target toolpath when the size of the contact area calculated by the additional calculation step exceeds the threshold value until the size of the contact area calculated by the additional calculation step becomes the threshold value or less and
wherein the auxiliary path generation step repeats the additional calculation step and the additional moved path generating step until the size of the contact area calculated by the additional calculation step becomes the threshold value or less.

5. The toolpath generation method according to claim 1, wherein in the calculation step, the size of the contact area is found as a ratio of an area of the contact area to an area of the bottom surface portion.

6. The toolpath generation method according to claim 1, wherein in the calculation step, the bottom surface portion of the rotary tool is converted to a round area on a virtual plane perpendicularly intersecting the rotational axis of the tool and the size of the contact area at the round area is calculated.

7. A toolpath generation method generating a toolpath when a rotary tool moves relative to a workpiece while processing the workpiece, the toolpath generation method comprising:
a step of using a predetermined target toolpath and a shape of the workpiece before processing by the target toolpath as a basis to find a contact area predicted to actually be in contact with a workpiece during processing by the target toolpath at a bottom surface portion of the rotary tool intersecting a rotational axis of the tool, wherein the bottom surface portion is in a form of a flat shaped end face or a curved end face included in a virtual cone defined by a curved bottom and a vertex on the rotational axis; and a step of generating a moved toolpath obtained by moving the target toolpath when at least part of the contact area overlaps a predetermined center area at the bottom surface portion until the contact area as a whole separates from the center area.

8. A toolpath generation device generating a toolpath when a rotary tool moves relative to a workpiece while processing the workpiece, the toolpath generation device comprising:

a calculating unit using a predetermined target toolpath and a shape of the workpiece before processing by the target toolpath as a basis to calculate a size of a contact area predicted to actually be in contact with the workpiece during processing by the target toolpath at a bottom surface portion of the rotary tool intersecting a rotational axis of the tool, wherein the bottom surface portion is in a form of a flat shaped end face or a curved end face included in a virtual cone defined by a curved bottom and a vertex on the rotational axis;

a moved path generating unit generating a moved toolpath obtained by moving the target toolpath when the size of the contact area exceeds a predetermined threshold value until the size of the contact area becomes the threshold value or less; and an auxiliary path generating unit generating an auxiliary toolpath for processing a still uncut part remaining at a processed workpiece resulting from the moved toolpath.

9. The toolpath generation device according to claim 8, wherein the calculating unit finds the size of the contact area as a ratio of an area of the contact area to an area of the bottom surface portion.

10. The toolpath generation device according to claim 8, wherein the calculating unit converts the bottom surface portion of the rotary tool to a round area on a virtual plane perpendicularly intersecting the rotational axis of the tool and calculates the size of the contact area at the round area.

11. The toolpath generation device according to claim 8, wherein the moved toolpath is a toolpath obtained by moving the target toolpath along the rotational axis of the tool in a direction away from the workpiece.

12. A toolpath generation device generating a toolpath when a rotary tool moves relative to a workpiece while processing the workpiece, the toolpath generation device comprising:

a calculating unit using a predetermined target toolpath and a shape of the workpiece before processing by the target toolpath as a basis to find a contact area predicted to actually be in contact with the workpiece during processing by the target toolpath at a bottom surface portion of the rotary tool intersecting a rotational axis of the tool, wherein the bottom surface portion is in a form of a flat shaped end face or a curved end face included in a virtual cone defined by a curved bottom and a vertex on the rotational axis;

a moved path generating unit generating a moved toolpath obtained by moving the target toolpath when at least part of the contact area overlaps a predetermined center area at a bottom surface portion until the contact area as a whole separates from the center area; and an auxiliary path generating unit generating an auxiliary toolpath for processing a still uncut part remaining at a processed workpiece resulting from the moved toolpath.

* * * * *